US 12,340,775 B2

(12) United States Patent
Morita et al.

(10) Patent No.: US 12,340,775 B2
(45) Date of Patent: Jun. 24, 2025

(54) DRIVER, ELECTROOPTICAL DEVICE AND ELECTRONIC APPARATUS

(71) Applicant: SEIKO EPSON CORPORATION, Tokyo (JP)

(72) Inventors: Akira Morita, Chino (JP); Chihiro Shin, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/332,775

(22) Filed: Jun. 12, 2023

(65) Prior Publication Data

US 2023/0410763 A1    Dec. 21, 2023

(30) Foreign Application Priority Data

Jun. 15, 2022  (JP) .................................. 2022-096321

(51) Int. Cl.
*G09G 3/20*      (2006.01)
*G02F 1/133*    (2006.01)
*G09G 3/36*      (2006.01)

(52) U.S. Cl.
CPC ....... *G09G 3/3696* (2013.01); *G02F 1/13306* (2013.01); *G09G 3/3614* (2013.01); *G09G 3/20* (2013.01); *G09G 2310/027* (2013.01); *G09G 2310/0289* (2013.01); *G09G 2310/0291* (2013.01); *G09G 2330/021* (2013.01)

(58) Field of Classification Search
CPC .... G02F 1/13306; G09G 3/20; G09G 3/3614; G09G 3/3688; G09G 3/3696; G09G 2310/027; G09G 2310/0289; G09G 2310/0291; G09G 2330/021
See application file for complete search history.

(56) References Cited

U.S. PATENT DOCUMENTS

| 2016/0111035 A1 | 4/2016 | Morita |
| 2023/0410762 A1* | 12/2023 | Morita ..................... G09G 3/20 |
| 2023/0410764 A1* | 12/2023 | Morita ................. G09G 3/3696 |

FOREIGN PATENT DOCUMENTS

JP        2016-080807        5/2016

* cited by examiner

*Primary Examiner* — Julie Anne Watko
(74) *Attorney, Agent, or Firm* — JCIPRNET

(57) ABSTRACT

A driver includes a first driving circuit and a second driving circuit. The second driving circuit includes a computation amplifier, an output capacitor, a first feedback capacitor, and a second feedback capacitor. The computation amplifier is composed of a transistor with a breakdown voltage lower than the breakdown voltage of a transistor making up the first driving circuit. The output capacitor is disposed between an output node of the computation amplifier and the signal supply line. The first feedback capacitor is disposed between an inverting input node of the computation amplifier and the signal supply line. One end of the second feedback capacitor is coupled to the inverting input node of the computation amplifier.

15 Claims, 26 Drawing Sheets

DRIVER, ELECTROOPTICAL DEVICE AND ELECTRONIC APPARATUS

The present application is based on, and claims priority from JP Application Serial Number 2022-096321, filed Jun. 15, 2022, the disclosure of which is hereby incorporated by reference herein in its entirety.

BACKGROUND

1. Technical Field

The present disclosure relates to a driver, an electrooptical device, an electronic apparatus and the like.

2. Related Art

JP-A-2016-80807 discloses a driver that includes a capacitance driving circuit and an amplifier circuit, and drives an electrooptic panel. After the start of capacitance driving for driving the electrooptic panel by the circuit capacitance driving circuit, the amplifier performs voltage driving for outputting the data voltage corresponding to the gradation data to the data voltage output terminal. In this manner, the voltage drop of the data line after the source line switch of the electrooptic panel turns on from off is compensated by the amplifier circuit, and thus the reduction in accuracy of the data voltage in the capacitance driving is suppressed.

Since a high voltage is required for the driving depending on the type of the liquid crystal panel, a computation amplifier composed of a high-breakdown voltage transistor is used as the driving circuit for driving such a liquid crystal panel. However, since the mobility of a high-breakdown voltage transistor is low, it is difficult to achieve both the frequency response characteristic and the amplification factor of the computation amplifier. For example, it is necessary to increase the frequency response characteristic of the computation amplifier to increase the drive speed in accordance with higher resolution, but if the frequency response characteristic is increased while maintaining the amplification factor of the computation amplifier, the power consumption of the computation amplifier is undesirably increased.

SUMMARY

An aspect of the present disclosure relates to a driver including a first driving circuit configured to supply a data signal to a signal supply line of an electrooptic panel based on gradation data, and a second driving circuit including a computation amplifier, an output capacitor, a first feedback capacitor, and a second feedback capacitor, and electrically coupled to the signal supply line, the computation amplifier being made up of a transistor with a breakdown voltage lower than a breakdown voltage of a transistor making up the first driving circuit, the output capacitor being disposed between an output node of the computation amplifier and the signal supply line, the first feedback capacitor being disposed between an inverting input node of the computation amplifier and the signal supply line, the second feedback capacitor including one end electrically coupled to the inverting input node of the computation amplifier.

In addition, another aspect of the present disclosure relates to an electrooptical device including the above-mentioned driver and the electrooptic panel.

In addition, still another aspect of the present disclosure relates to an electronic apparatus including the above-mentioned driver.

DESCRIPTION OF EXEMPLARY EMBODIMENTS

A preferred embodiment of the present disclosure is elaborated below. The embodiment described below does not unduly limit the contents of the claims, and not all of the configurations described in the embodiment are essential configuration requirements.

1. Electrooptical Device

Figure 1:
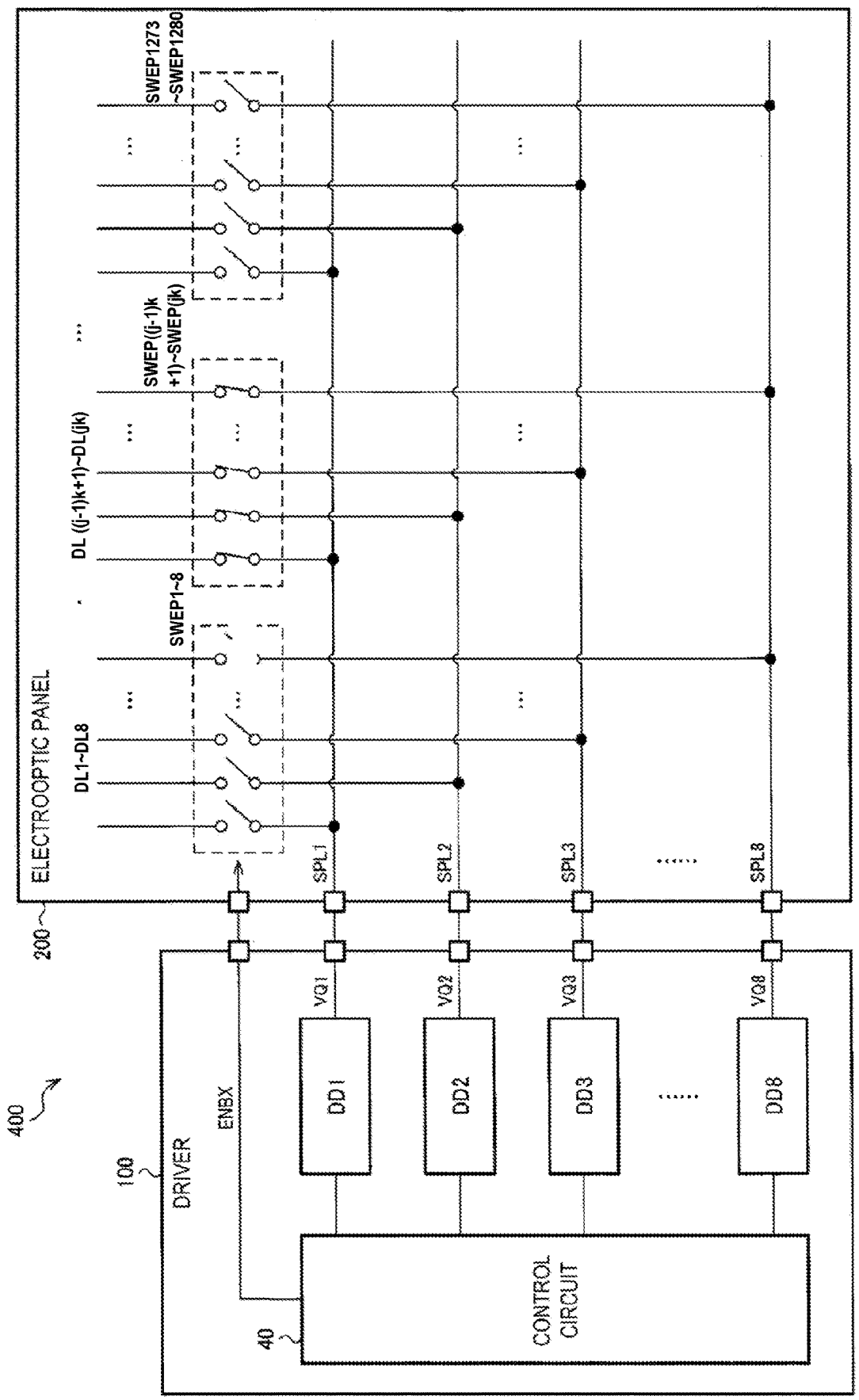
FIG. 1 illustrates an exemplary configuration of an electrooptical device.

FIG. 1 illustrates a configuration example of an electrooptical device. An electrooptical device 400 includes a driver 100 and an electrooptic panel 200. While the electrooptical device 400 of a phase expansion driving type is described as an example in the following description, this is not limitative, and the electrooptical device 400 may be of a demultiplexing driving type, for example.

The driver 100 drives the electrooptic panel 200 by outputting a data signal to a signal supply line of the electrooptic panel 200. Note that the voltage written to one pixel at one time is referred to as data voltage. Further, when a plurality of pixels is driven in a time-series manner, the data voltage for each pixel is output as a time-series signal to the signal supply line, and this signal to the signal supply line is referred to as data signal.

The scan line driving circuit that drives the scan line of the electrooptic panel 200 may be included in the driver 100, or may be provided outside the driver 100. The driver 100 is an integrated circuit device in which a plurality of circuit elements is integrated on a semiconductor substrate, for example. The driver 100 includes a control circuit 40, and first to kth data line driving circuits DD1 to DDk. The k is an integer of 2 or more. Note that an exemplary case where k=8 is described below.

The control circuit 40 outputs corresponding gradation data to each data line driving circuit of the data line driving circuits DD1 to DD8. In addition, the control circuit 40 outputs a control signal ENBX for controlling the data line switch to the electrooptic panel 200.

The data line driving circuits DD1 to DD8 convert gradation data into a data voltage, and output the data voltage as output voltages VQ1 to VQ8 to signal supply lines SPL1 to SPL8 of the electrooptic panel 200. The output voltages VQ1 to VQ8 change in accordance with time-series gradation data, and the signals of the changing output voltages VQ1 to VQ8 correspond to the above-described data signal.

The electrooptic panel 200 includes the first to eighth signal supply lines SPL1 to SPL8, first to 1280th data line switches SWEP1 to SWEP1280, and first to 1280th data lines DL1 to DL1280. The number of data lines may be k×t. The t is an integer of 2 or more. Here, WXGA is taken as an example, and t=160 is set.

One end of each of data line switches SWEP ((j−1)×k+1) to SWEP (j×k) of the data line switches SWEP1 to SWEP1280 is coupled to the signal supply lines SPL1 to SPL8. The j is an integer of 160 or smaller. For example, in the case of j=1, they are the data line switches SWEP1 to SWEP8.

Each of the data line switches SWEP1 to SWEP1280 is composed of a TFT or the like, and is controlled based on the control signal ENBX, for example. TFT is an abbreviation of Thin Film Transistor. For example, the electrooptic panel 200 includes a switch control circuit not illustrated in the drawing, and the switch control circuit controls the data line switches SWEP1 to SWEP1280 on or off on the basis of the control signal ENBX.

The data line driving circuits DD1 to DD8 perform the driving 160 times in the horizontal scanning period, and, in the jth driving, data line switches SWEP ((j−1)×k+1) to SWEP (j×k) are on, and the other data line switches are off. In this manner, in the jth driving, the data lines D L ((j−1)×k+1) to DL (j×k) are driven. Regarding the data line driving circuit DD1, in the horizontal scanning period, the data line switches SWEP1, SWEP2, . . . , SWEP1273 are sequentially turned on, and the data line driving circuit DD1 sequentially drives the data lines DL1, DL2, . . . , DL1273.

2. First Embodiment

Figure 2:
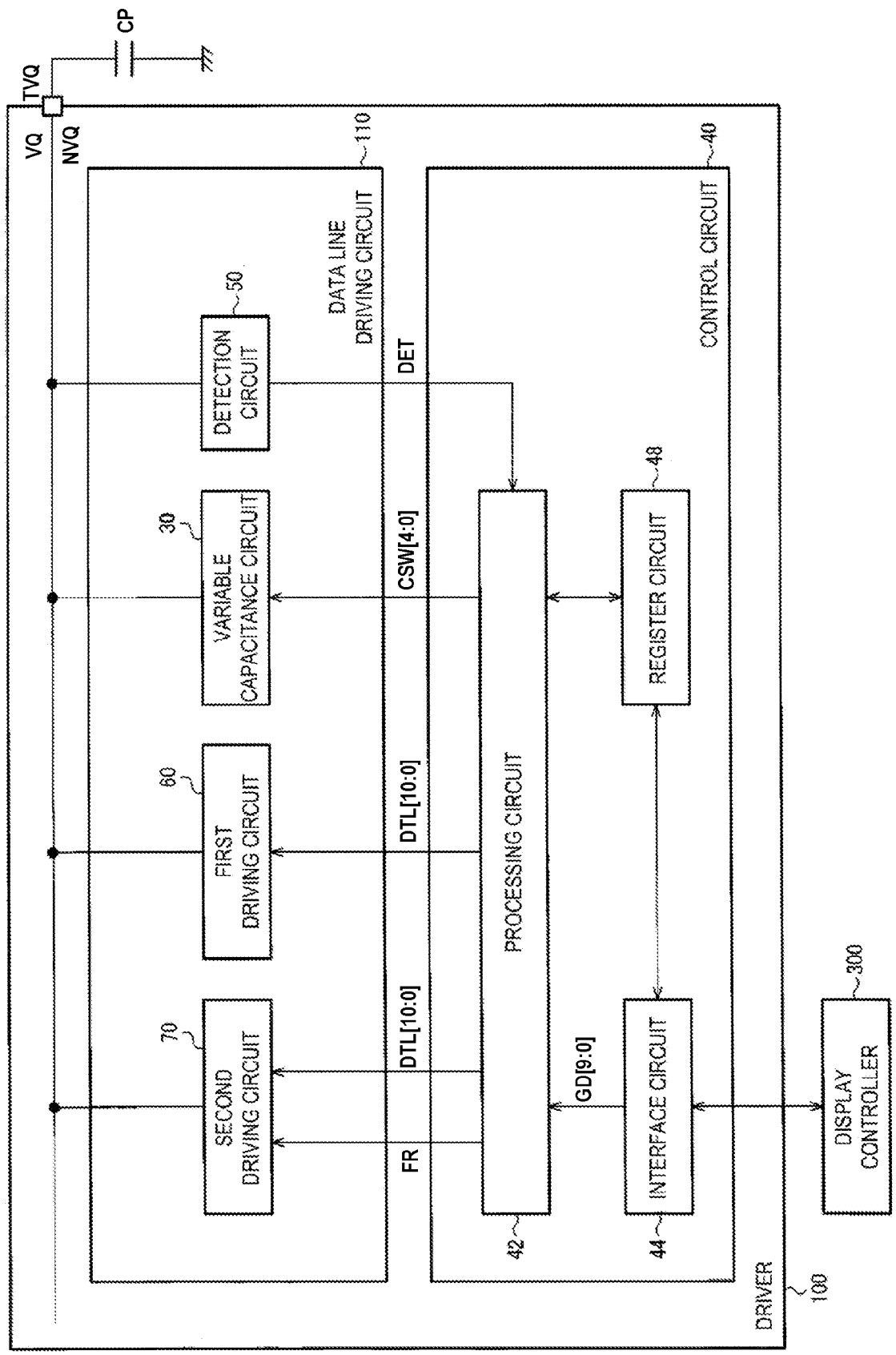
FIG. 2 illustrates a first specific configuration example of a driver.

FIG. 2 illustrates a first specific configuration example of a driver. The driver 100 includes a data line driving circuit 110 and the control circuit 40. The data line driving circuit 110 corresponds to any one of the data line driving circuits DD1 to DD8 of FIG. 1.

The data line driving circuit 110 includes a first driving circuit 60, a second driving circuit 70, a variable capacitance circuit 30, and a detection circuit 50. The control circuit 40 includes a processing circuit 42, an interface circuit 44, and a register circuit 48.

The interface circuit 44 performs an interface process between a display controller 300 that controls the driver 100 and the driver 100. The interface circuit 44 outputs, to the processing circuit 42, gradation data GD [9:0] received from the display controller 300. Note that the number of bits of the received gradation data may be arbitrary. The interface circuit 44 is an image interface circuit of an LVDS type, a parallel RGB type, a display port type or the like, for example. LVDS is an abbreviation of Low Voltage Differential Signaling.

In an initialization process at the time of power on of the driver 100 and the like, the processing circuit 42 determines setting data CSW [4:0] of the capacitance value of the variable capacitance circuit 30, and stores the setting data CSW [4:0] in the register circuit 48. In a normal operation for driving the electrooptic panel 200, the processing circuit 42 sets the capacitance value of the variable capacitance circuit 30 with the setting data CSW [4:0] read from the register circuit 48. In addition, on the basis of gradation data GD [9:0], the processing circuit 42 outputs gradation data DTH [10:0] to the first driving circuit 60, and outputs gradation data DTL [10:0] to the second driving circuit 70. In addition, the processing circuit 42 outputs a polarity inversion signal FR to the second driving circuit 70. Note that depending on the configuration of the second driving circuit 70, the input of the polarity inversion signal FR to the second driving circuit 70 may be omitted.

An output node NVQ is a node coupled to a data voltage output terminal TVQ, and the voltage of the output node NVQ is an output voltage VQ. The load capacitance of the data voltage output terminal TVQ is an electrooptic panel side capacitance CP.

The first driving circuit 60 supplies the charge corresponding to the gradation data DTH [10:0] to the output node NVQ through charge redistribution using the capacitor. When the charge is distributed to the variable capacitance circuit 30 and the electrooptic panel side capacitance CP, the output voltage VQ becomes a data voltage corresponding to the gradation data DTH [10:0]. The first driving circuit 60 is composed of a high-breakdown voltage process circuit element that can drive the electrooptic panel 200. In an exemplary case where the electrooptic panel 200 is a liquid crystal panel of a high-temperature polysilicon type, the power source voltage of the first driving circuit 60 is about 15 V to 20 V, and the first driving circuit 60 is composed of a circuit element with a breakdown voltage higher than that of the power source voltage.

When there is an error in the charge output by the first driving circuit 60, or the charge storage of the output node NVQ is slightly not viable, an error occurs between the output voltage VQ due to the charge output by the first driving circuit 60 and the target voltage corresponding to the gradation data DTH [10:0]. The second driving circuit 70 corrects the output voltage VQ to the target voltage through a feedback-control using a computation amplifier. In this case, since the error between the output voltage VQ and the target voltage is small, the amount of the charge output by the second driving circuit 70 can be small. By utilizing this, the computation amplifier is configured with a low-breakdown voltage process circuit element, while making DC-cut between the computation amplifier and the output node NVQ with a capacitor. As an example, the breakdown voltage of the low-breakdown voltage process is about ⅓ to 1/10 of the breakdown voltage of the high-breakdown voltage process. The second driving circuit 70 operates with a power source voltage lower than the breakdown voltage of the low-breakdown voltage process.

A capacitance value determination method of the variable capacitance circuit 30 and configuration examples of the variable capacitance circuit 30 and the detection circuit 50 are described below.

The detection circuit 50 compares a given detection voltage and the output voltage VQ, and outputs the result as a detection signal DET. The detection circuit 50 is a comparator, for example.

The processing circuit 42 outputs the gradation data DTH [10:0] corresponding to a given data voltage to a capacitor driving circuit 20. In this case, the above-mentioned given detection voltage is set to the same voltage as the given data voltage, which is an expected value of the output voltage VQ. The processing circuit 42 sequentially changes the capacitance value of the variable capacitance circuit 30 by sequentially changing the value of the setting data CSW [4:0]. The processing circuit 42 determines the capacitance value of the variable capacitance circuit 30 on the basis of the detection signal DET at each capacitance value. Specifically, the processing circuit 42 determines the capacitance value with which the output voltage VQ is set to the given detection voltage on the basis of the detection signal DET, and stores the setting data CSW [4:0] of the capacitance value in the register circuit 48.

The variable capacitance circuit 30 includes first to fifth adjusting capacitors and first to fifth adjusting switches. One end of the first adjusting switch is coupled to the output node NVQ, and the other end is coupled to one end of the first adjusting capacitor. The other end of the first adjusting capacitor is coupled to the ground node. The same applies to the second to fifth adjusting capacitors and the second to fifth adjusting switches. The capacitance values of the first to fifth adjusting capacitors are weighted in a binary manner. The first adjusting switch is controlled on or off by the CSW [0]. Likewise, the second to fifth adjusting switches are controlled on or off by the CSW [1] to CSW [4].

The first driving circuit 60, the second driving circuit 70, the variable capacitance circuit 30 and the detection circuit 50 are described in detail below.

Figure 3:
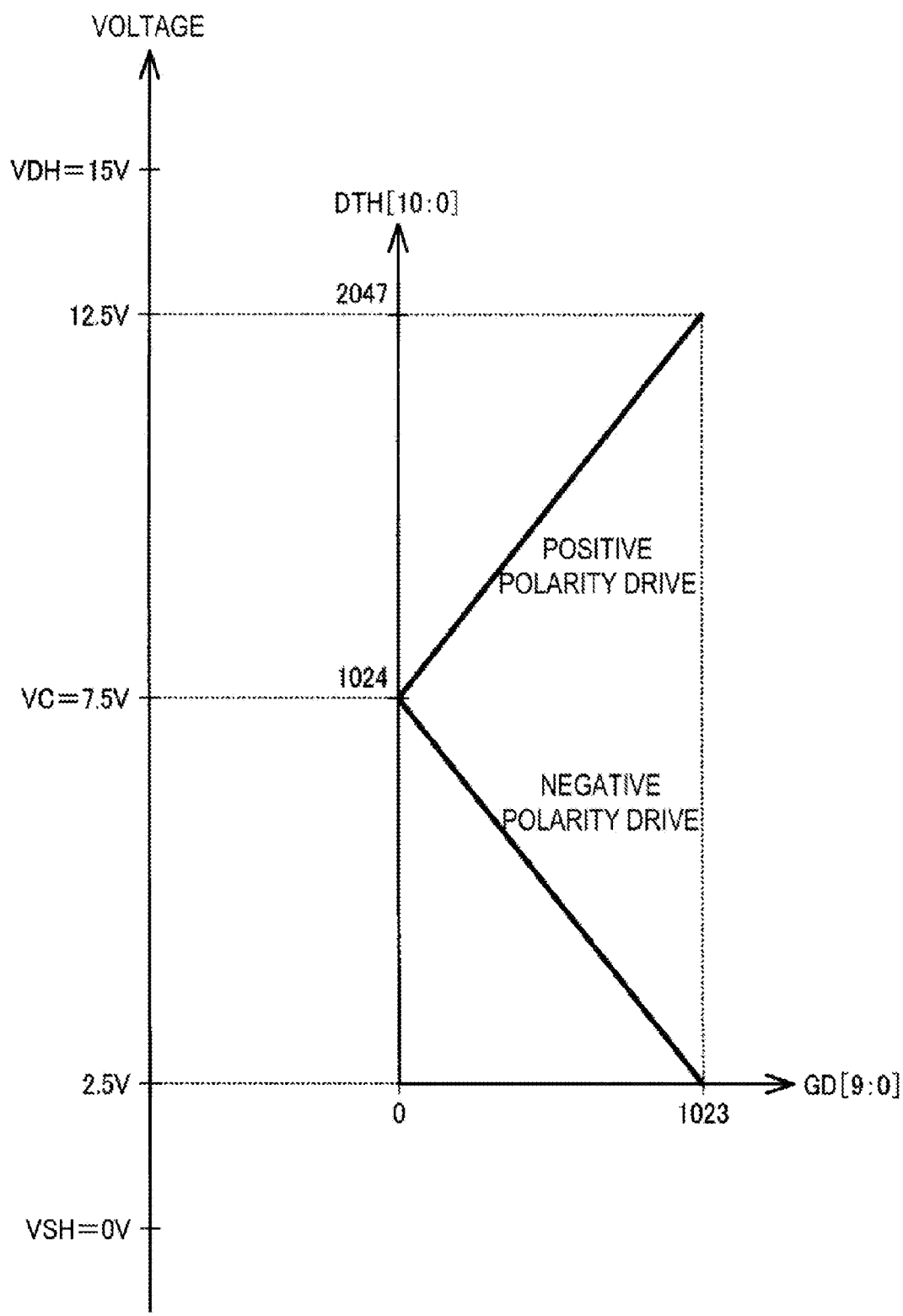
FIG. 3 is a diagram illustrating a relationship between gradation data and data voltage.

FIG. 3 is a diagram illustrating a relationship between gradation data and data voltage.

The processing circuit 42 converts the input gradation data GD [9:0] into the gradation data DTH [10:0]. More specifically, the processing circuit 42 converts the GD [9:0] of gradation values 0 to 1023 into the DTH [10:0] of gradation values 1023 to 0 in the negative polarity drive, and converts the GD [9:0] of gradation values 0 to 1023 into the DTH [10:0] of gradation values 1024 to 2047 in the positive polarity drive.

VSH=0 V is a low-potential side power source voltage of the first driving circuit 60. VDH=15 V is a high-potential side power source voltage of the first driving circuit 60. The common voltage supplied to the opposite electrode of the electrooptic panel 200 is VC=7.5 V. The data voltage supplied to the pixel is 7.5 V to 2.5 V in the negative polarity drive, and 7.5 V to 12.5 V in the positive polarity drive.

Figure 4:
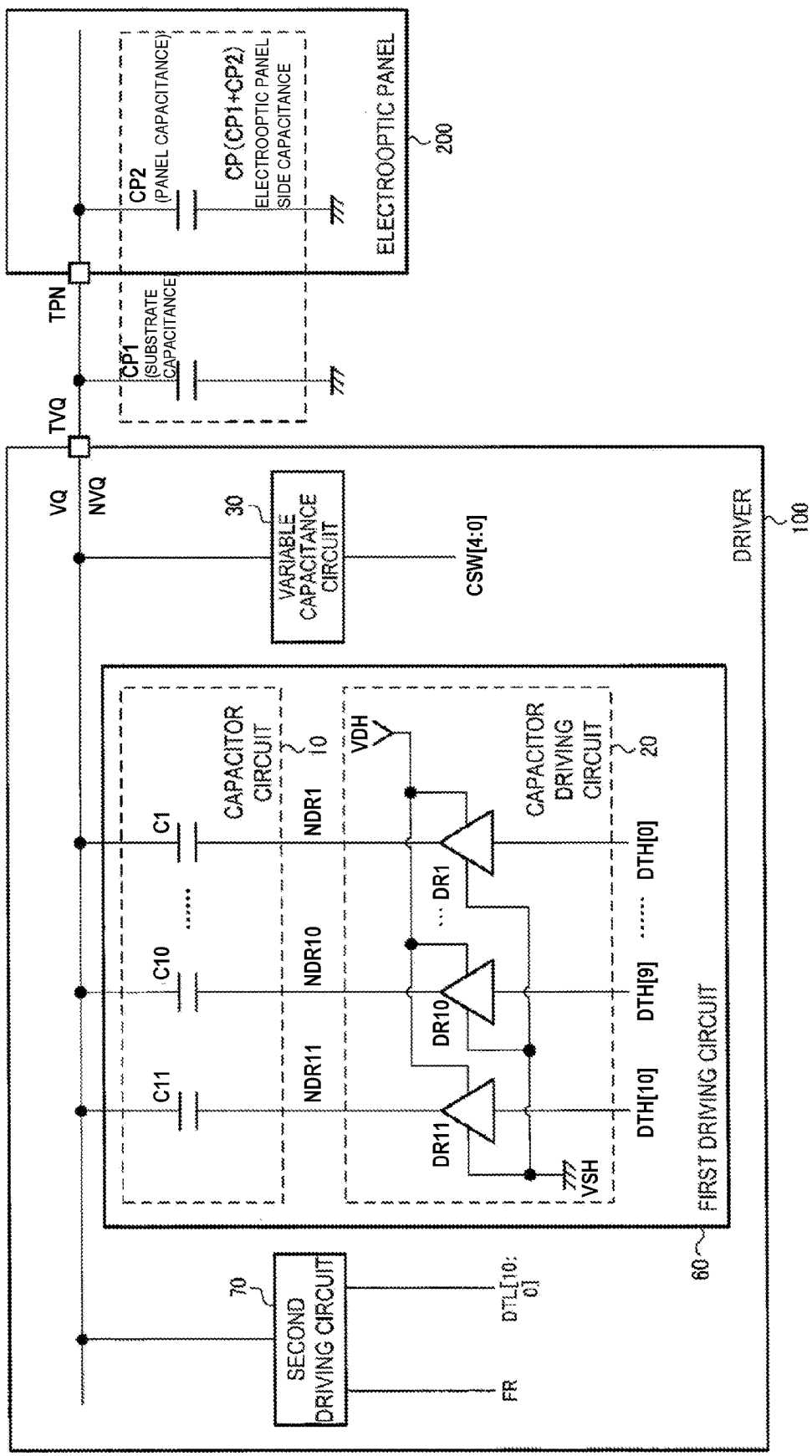
FIG. 4 illustrates a first specific configuration example of a first driving circuit.

FIG. 4 illustrates a first specific configuration example of a first driving circuit. Note that in the following description, as the reference symbol representing the capacitance value of the capacitor, the same reference symbol as the reference symbol of that capacitor is used. For example, the capacitance value of a capacitor C1 is represented by C1.

A capacitor circuit 10 includes first to n-th capacitors C1 to Cn. The capacitor driving circuit 20 includes first to n-th driving circuits DR1 to DRn. While an example of n=11 is described below, it suffices that n is an integer of 2 or more. It suffices that n is set to the same number as the number of bits of the gradation data DTH [10:0].

One end of the capacitor Ci is coupled to the output node NVQ, and the other end is coupled to a capacitor drive node NDRi. The i is an integer of 1 or more and n=11 or smaller. The capacitors C1 to C10 are capacitance values weighted in a binary manner. More specifically, the capacitance value of the capacitor Ci is $2^{(i-1)} \times C1$.

The processing circuit 42 outputs the ith bit DTH [i−1] of the gradation data DTH [10:0] to the input node of the driving circuit DRi. The driving circuit DRi outputs the first voltage level to the capacitor drive node NDRi when the bit DTH [i−1] is at the first logic level, and outputs the second voltage level to the capacitor drive node NDRi when the bit DTH [i−1] is at the second logic level. For example, the first logic level is "0", the second logic level is "1", the first voltage level is the low-potential side power source voltage VSH, and the second voltage level is the high-potential side power source voltage VDH. The driving circuit DRi is composed of a high-breakdown voltage process transistor, and operates with the power source voltages VDH and VSH. The driving circuit DRi is composed of a level shifter that level-shifts the input logic level to the output voltage level of the driving circuit DRi, and a buffer circuit that buffers the output of the level shifter.

When the driving circuits DR1 to DR11 drive the capacitors C1 to C11, charge redistribution occurs between the capacitors C1 to C11, the variable capacitance circuit 30, and the electrooptic panel side capacitance CP. As a result, the data voltage is output to the output node NVQ.

The electrooptic panel side capacitance CP is the sum of the capacitances seen from the data voltage output terminal TVQ. For example, the electrooptic panel side capacitance CP is obtained by adding up a substrate capacitance CP1, which is the parasitic capacitance of the printed board, and a panel capacitance CP2, which is the parasitic capacitance in the electrooptic panel 200. The printed board is a substrate on which the driver 100 is mounted and which is coupled to the electrooptic panel 200.

It is assumed that the sum of the capacitance values of the capacitors C1 to C11 is Ctot=C1+C2+–+C11, and the capacitance value of the variable capacitance circuit 30 is CF. As an example, the CF is set such that Ctot/(CF+CP)=2 holds. In this case, at the maximum gradation value 2047 of the DTH [10:0], VQ=15 V×{Ctot/(Ctot+CF+CP)}+2.5 V=10 V+2.5 V=12.5 V is obtained. At the minimum gradation value 0 of the DTH [10:0], VQ=0 V×{Ctot/(Ctot+CF+CP)}+2.5 V=0 V+2.5 V=2.5 V is obtained. In this manner, the same data voltage as the example of FIG. 3 is achieved.

Figure 5:
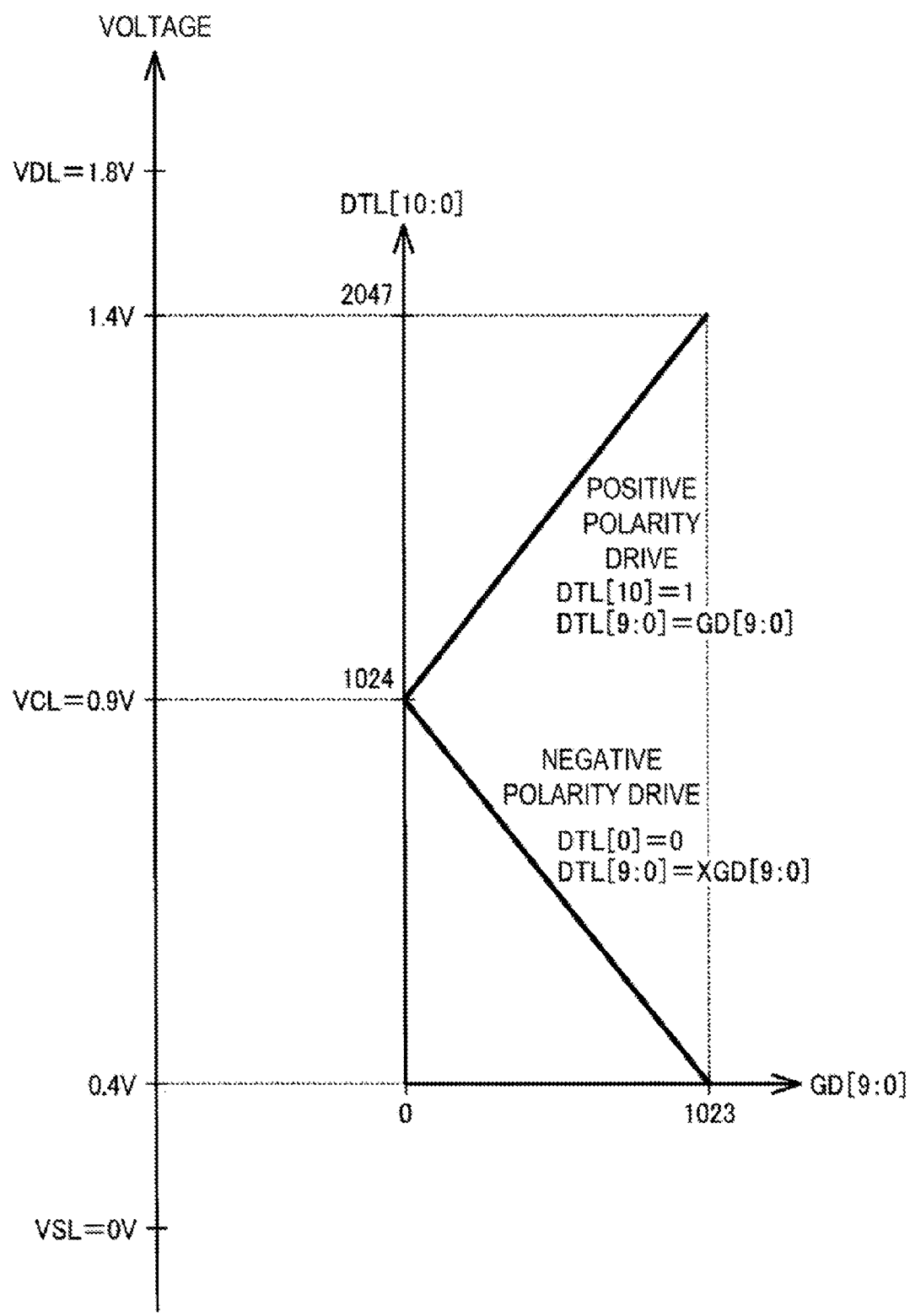
FIG. 5 is a diagram illustrating an example of a relationship between gradation data and a voltage of a low-breakdown voltage second driving circuit.

FIG. 5 is a diagram illustrating an example of a relationship between gradation data and a voltage of a low-breakdown voltage second driving circuit.

The processing circuit 42 converts the input gradation data GD [9:0] into the gradation data DTL [10:0]. More specifically, the processing circuit 42 sets the DTL [10]=1 and DTL [9:0]=GD [9:0] in the negative polarity drive, and sets the DTL [10]=0 and DTL [9:0]=XGD [9:0] in the positive polarity drive. The XGD [9:0] is data obtained through logic inversion of each bit of the GD [9:0].

VSL=0 V is a low-potential side power source voltage of the second driving circuit 70. VDL=1.8 V is a high-potential side power source voltage of the second driving circuit 70. The voltage corresponding to the common voltage VC=7.5 V of FIG. 3 is VCL=0.9 V. The voltage corresponding to the data voltage 7.5 V to 2.5 V supplied to the pixel in the negative polarity drive is 0.9 V to 0.4 V, and the voltage corresponding to the data voltage 7.5 V to 12.5 V supplied to the pixel in the positive polarity drive is 0.9 V to 1.4 V.

Figure 6:
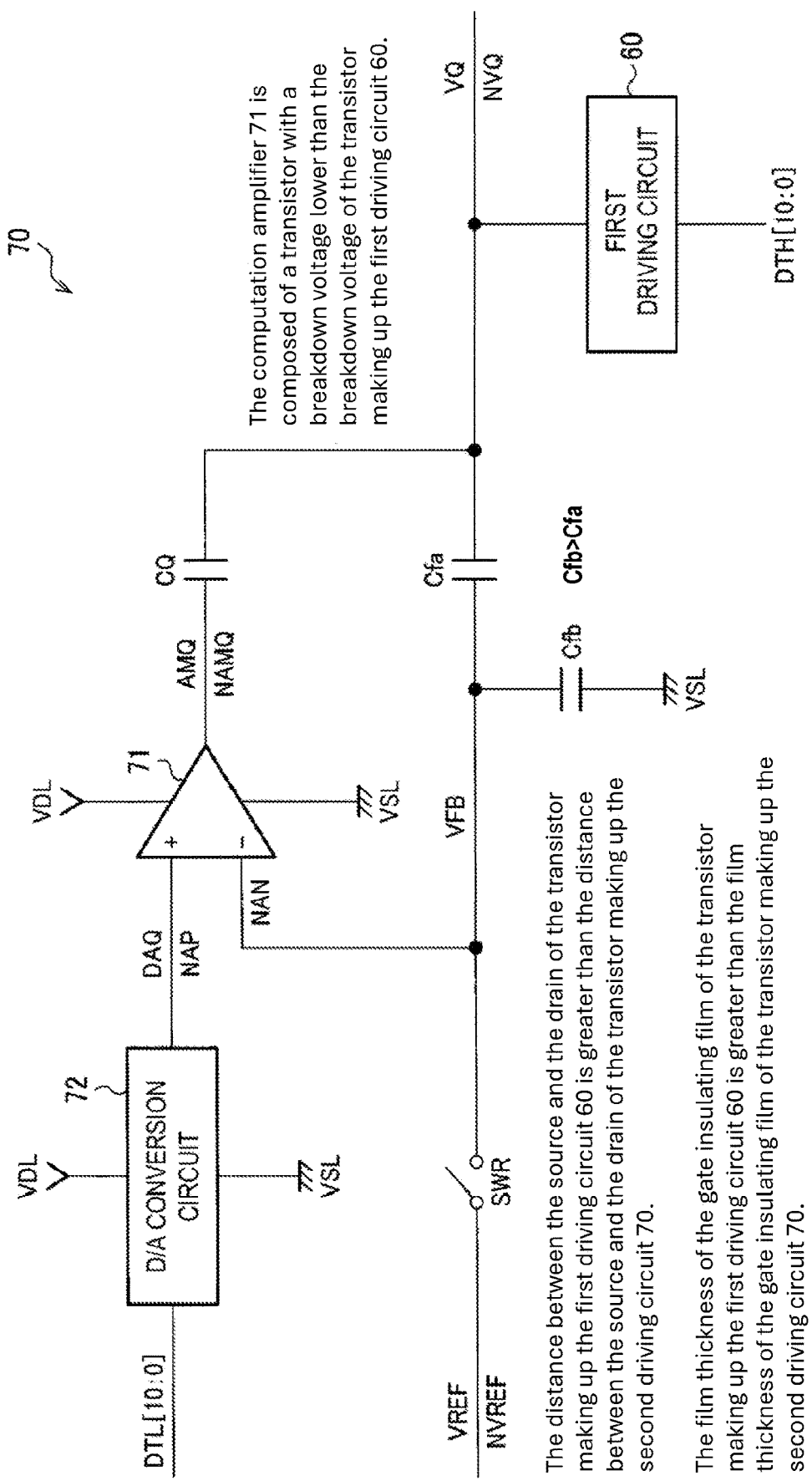
FIG. 6 illustrates a first specific configuration example of the second driving circuit.

FIG. 6 illustrates a first specific configuration example of the second driving circuit. The second driving circuit 70 includes a computation amplifier 71, a D/A conversion circuit 72, an output capacitor CQ, a first feedback capacitor Cfa, a second feedback capacitor Cfb, and an initialization switch SWR.

The D/A conversion circuit 72 D/A-converts the gradation data DTL [10:0] into a D/A conversion voltage DAQ, and the outputs the D/A conversion voltage DAQ to a non-inverting input node NAP of the computation amplifier 71. The correspondence between the gradation data DTL [10:0] and the D/A conversion voltage DAQ is as described with FIG. 5. The D/A conversion circuit 72 includes a ladder resistor that divides the power source voltages VDL and VSL into a plurality of voltages, and a switch circuit that selects the voltage corresponding to the gradation data DTL [10:0] from among the plurality of voltages, for example.

The computation amplifier 71 is composed of a low-breakdown voltage process transistor, and operates with the power source voltages VDL and VSL. More specifically, the distance between the source and the drain of the transistor making up the first driving circuit 60 is greater than the distance between the source and the drain of the transistor making up the second driving circuit 70 including the computation amplifier 71. Alternatively, the film thickness of the gate insulating film of the transistor making up the first driving circuit 60 is greater than the film thickness of the gate insulating film of the transistor making up the second driving circuit 70 including the computation amplifier 71. It should be noted that while the above-mentioned configuration is an example of a configuration in which the breakdown voltage of the transistor differs, it suffices that the transistor of each driving circuit is configured such that the breakdown voltage of the transistor making up the second driving circuit 70 is lower than the breakdown voltage of the transistor making up the first driving circuit 60.

One end of the output capacitor CQ is coupled to an output node NAMQ of the computation amplifier 71, and the other end is coupled to the output node NVQ of the data line driving circuit 110. One end of the first feedback capacitor Cfa is coupled to an inverting input node NAN of the computation amplifier 71, and the other end is coupled to the output node NVQ of the data line driving circuit 110. One end of the second feedback capacitor Cfb is coupled to the inverting input node NAN of the computation amplifier 71, and the other end is coupled to the node of the low-potential side power source voltage VSL. Note that it suffices that the other end of the second feedback capacitor Cfb is coupled to a predetermined potential node to which a constant potential is supplied.

One end of the initialization switch SWR is coupled to the inverting input node NAN of the computation amplifier 71, and the other end is coupled to a node NVREF to which a reference voltage VREF is supplied. The reference voltage VREF is a voltage higher than the VSL and lower than the VDL. It is assumed here that VREF=VCL=0.9 V holds. The reference voltage VREF is supplied to the node NVREF from the voltage generation circuit not illustrated in the drawing included in the driver 100, for example. The initialization switch SWR is an analog switch, and is an N-type transistor, a P-type transistor or a transfer gate combining them, for example.

In the example of FIGS. 3 and 5, the range of the output voltage VQ is 10 V, and the voltage range of the D/A conversion voltage DAQ is 1 V. In this case, it suffices that the voltage range is divided in 9:1 by the first feedback capacitor Cfa and the second feedback capacitor Cfb, and thus Cfb/Cfa=9 holds. Note that the ratio of Cfb and Cfa is not limited to 9, and may be set as necessary in accordance with the ratio of the voltage range.

The capacitance value of the output capacitor CQ may be arbitrary as long as an output voltage AMQ of the computation amplifier 71 is set within the range of VSL to VDL. For example, the capacitance value of the output capacitor CQ is set to about 1 to 10 times the sum of the capacitor circuit 10, the variable capacitance circuit 30 and the electrooptic panel side capacitance CP. As an example, in the case where the capacitance value of the output capacitor CQ is four times the above-mentioned sum, an error of 0.1 V of the output voltage VQ can be compensated by changing the output voltage AMQ of the computation amplifier 71 by 0.1 V×(5/4)=0.125 V.

Figure 7:
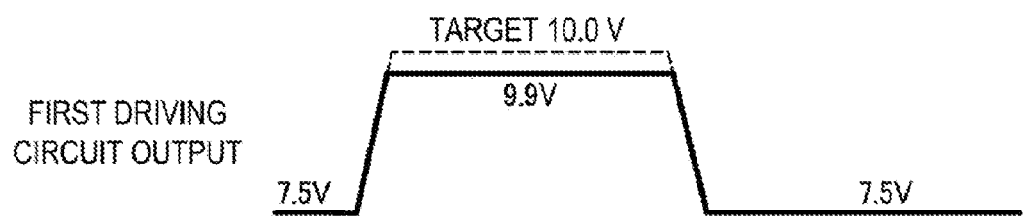
FIG. 7 illustrates a first waveform example for describing operations of the first driving circuit and the second driving circuit.
Figure 7:
Figure 7:
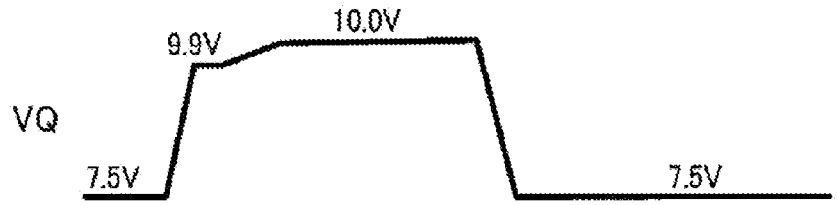
Figure 7:
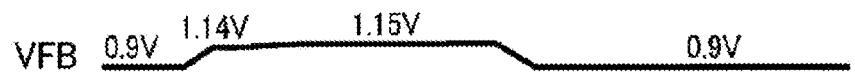
Figure 7:

FIG. 7 illustrates a first waveform example for describing operations of the first driving circuit and the second driving circuit. It is assumed that the gradation values of the gradation data DTH [10:0] and DTL [10:0] change from 1024 to 1535 and to 1024. The target voltage corresponding to the gradation value 1535 is 10.0 V.

It is assumed that in the case where the second driving circuit 70 is not provided and the driving is performed only with the first driving circuit 60, the output voltage VQ changes from 7.5 V to 9.9 V when the gradation value changes from 1024 to 1535. The difference from the target voltage 10.0 V is 0.1 V. An operation of the second driving circuit 70 in this case is described below.

When the gradation value changes from 1024 to 1535, the D/A conversion circuit 72 sets the D/A conversion voltage DAQ from 0.9 V to 1.15 V. The output voltage VQ is changed from 7.5 V to 9.9 V by the first driving circuit 60, a voltage VFB of the inverting input node NAN of the computation amplifier 71 changes from 0.9 V to 0.9 V+(9.9 V−7.5 V)/10=1.14 V. The computation amplifier 71 sets the output voltage AMQ from 0.9 V to 0.9 V+(10.0 V−9.9 V)×(5/4)=1.025 V to set VFB=DAQ=1.15 V. In this manner, the output voltage VQ is set to the target voltage of 10.0 V, and the voltage VFB is set to 1.15 V.

Figure 8:
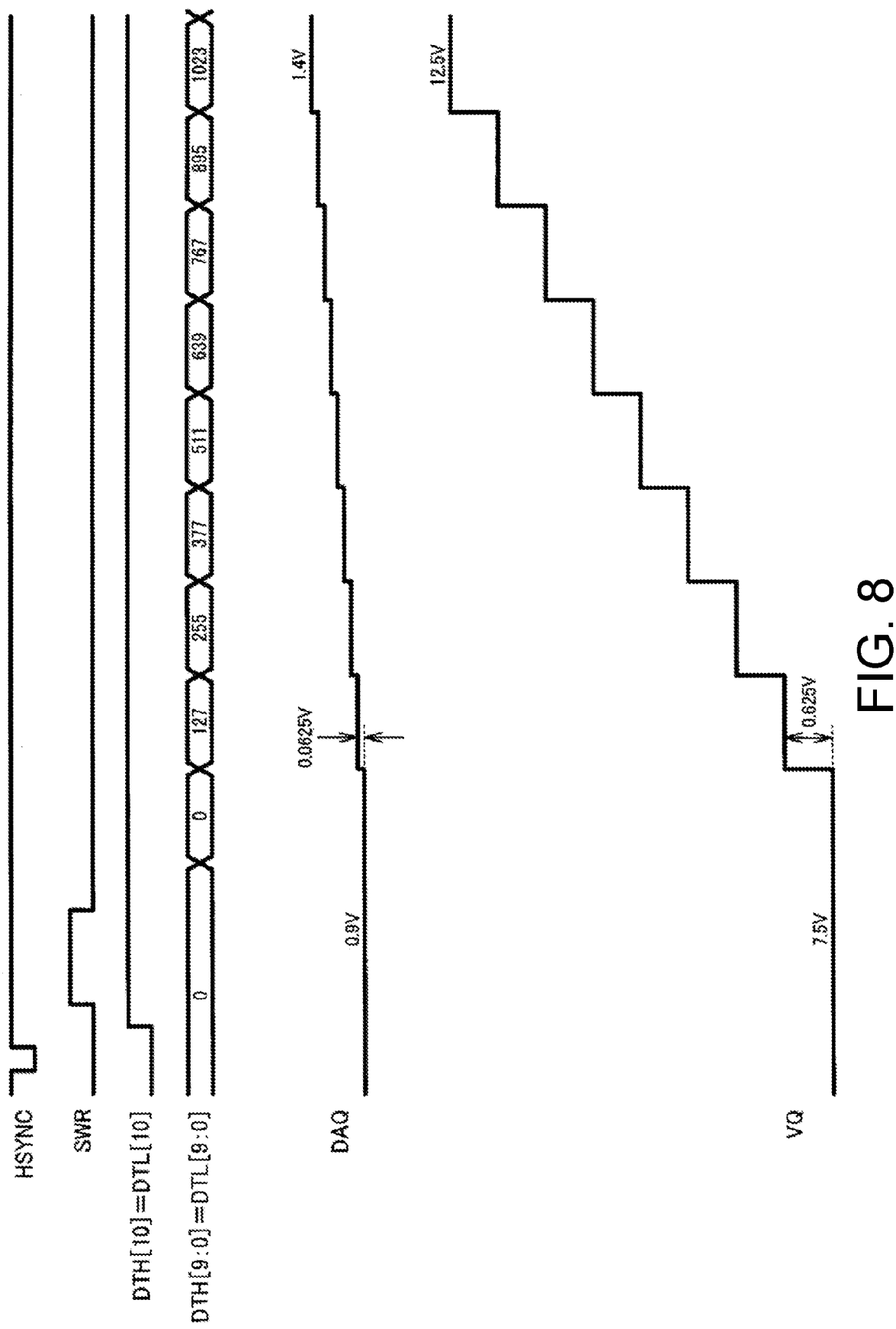
FIG. 8 illustrates a second waveform example for describing operations of the first driving circuit and the second driving circuit.

FIG. 8 illustrates a second waveform example for describing operations of the first driving circuit and the second driving circuit. FIG. 8 illustrates a waveform example of a horizontal scanning period in a positive polarity drive period of a polarity inversion drive. While an example in which the gradation values 0, 127, . . . , 1023 are sequentially written to nine pixels is described here, the number of pixels driven in the horizontal scanning period and the gradation value written to each pixel may be arbitrary.

The rising edge of a horizontal synchronization signal HSYNC is set as the start timing of the horizontal scanning period. After the horizontal scanning period is started, the processing circuit 42 outputs the DTH [9:0]=DTL [9:0]=0, and sets the DTH [10]=DTL [10] from 0 to 1. In this case, 0 is the low level and 1 is the high level. This corresponds to the DTH [10:0]=DTL [10:0]=1024, and therefore the D/A conversion voltage DAQ=0.9 V and the output voltage VQ=7.5 V are obtained.

Next, the initialization switch SWR turns from off to on, and from on to off. Here, off is the low level, and on is the high level. When the initialization switch SWR is on, the voltage VFB of the inverting input node NAN of the computation amplifier 71 is initialized to the reference voltage VREF=0.9 V. Note that the period in which the initialization of the voltage VFB is performed is referred to as initialization period. In FIG. 8, the period in which the initialization switch SWR is on corresponds to the initialization period.

Next, writing to the pixel is started. The processing circuit 42 sequentially outputs the DTH [9:0]=DTL [9:0] of the gradation values 0, 127, . . . , 1023. As a result, the D/A conversion voltage DAQ sequentially changes from 0.9 V to 1.4 V, and the output voltage VQ sequentially changes from 7.5 V to 12.5 V. Note that while the gradation value for which the voltage range is easy to understand is exemplified here, the gradation value written to each pixel may be arbitrary as described above.

Figure 9:
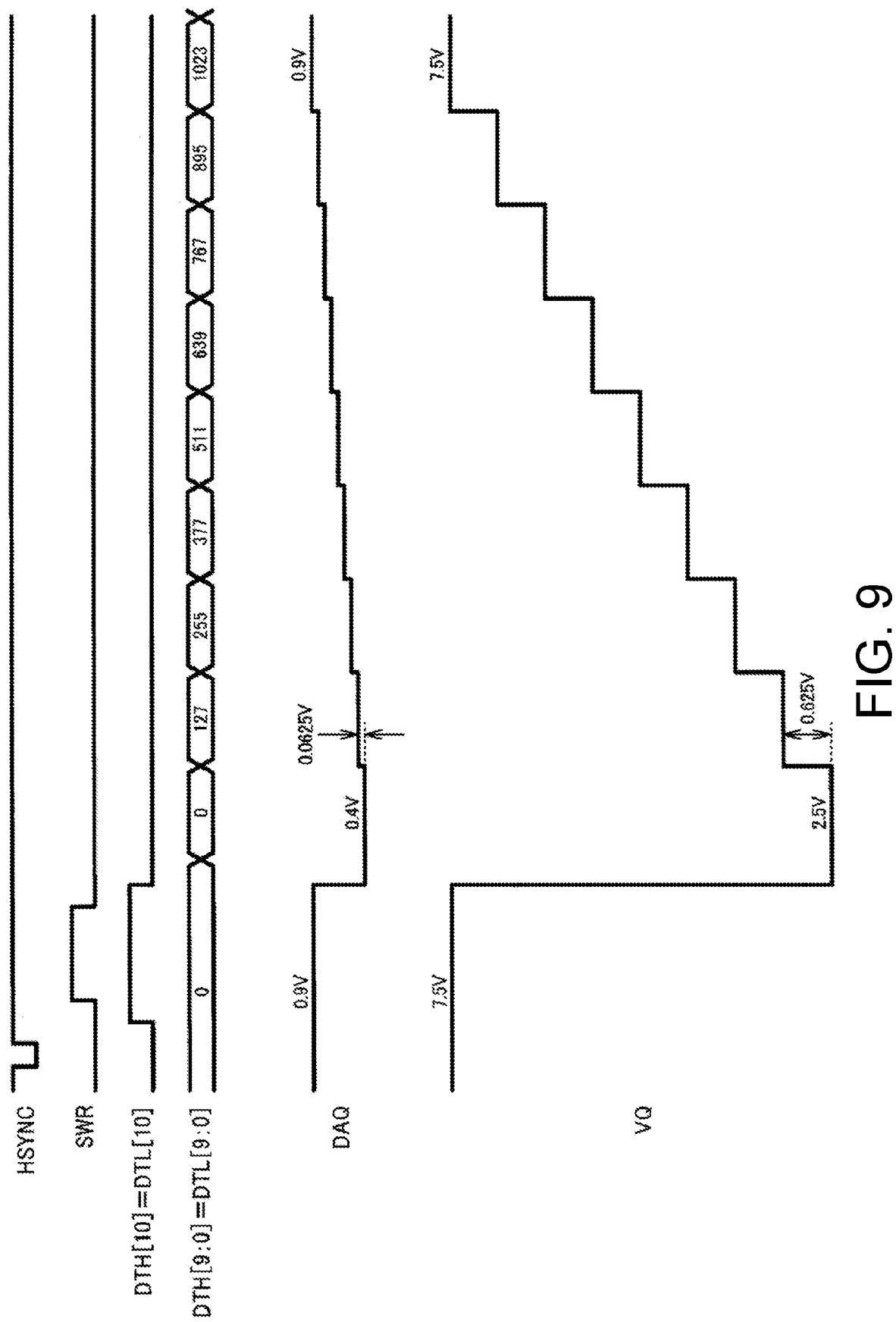
FIG. 9 illustrates a third waveform example for describing operations of the first driving circuit and the second driving circuit.

FIG. 9 illustrates a third waveform example for describing operations of the first driving circuit and the second driving circuit. FIG. 9 illustrates a waveform example of a horizontal scanning period in a negative polarity drive period in a polarity inversion drive.

After the horizontal scanning period is started, the processing circuit 42 outputs the DTH [9:0]=DTL [9:0]=0, and sets the DTH [10]=DTL [10] from 0 to 1. This corresponds to the DTH [10:0]=DTL [10:0]=1024, and therefore the D/A conversion voltage DAQ=0.9 V and the output voltage VQ=7.5 V are obtained.

Next, the initialization switch SWR turns from off to on, and from on to off. When the initialization switch SWR is on, the voltage VFB of the inverting input node NAN of the computation amplifier 71 is initialized to the reference voltage VREF=VCL=0.9 V.

Next, the processing circuit 42 sets DTH [10]=DTL [10] from 1 to 0. As a result, DTH [10:0]=DTL [10:0]=0 is set, and the D/A conversion voltage DAQ changes from 0.9 V to 0.4 V, and, the output voltage VQ changes from 7.5 V to 2.5 V.

Next, writing to the pixel is started. The processing circuit 42 sequentially outputs the DTH [9:0]=DTL [9:0] of the gradation values 0, 127, . . . , 1023. As a result, the D/A conversion voltage DAQ sequentially changes from 0.4 V to 0.9 V, and the output voltage VQ sequentially changes from 2.5 V to 7.5 V. Note that while the gradation value for which the voltage range is easy to understand is exemplified here, the gradation value written to each pixel may be arbitrary.

Note that while the DTH [10:0]=DTL [10:0] is described above, DTH [10:0]≠DTL [10:0] may be set with correction data added to the gradation data DTH [10:0]. The correction data is, for example, data for correcting the excess/deficient electric charge amount. The excess/deficient electric charge amount is excess or deficiency between the charge output by the first driving circuit 60 with the gradation data DTH [10:0] to which the correction data is not added, and the charge required for setting the output voltage VQ to the target voltage. The correction data is data obtained by converting the excess/deficient electric charge amount to a gradation value. Adding correction data to the gradation data DTH [10:0] can reduce the error between the output voltage VQ due to the charge output by the first driving circuit 60 and the target voltage corresponding to the gradation data DTH [10:0]. In the case where such a correction is performed, when there is still an error between the output voltage VQ and the target voltage even after the correction, the second driving circuit 70 corrects the error through a feedback-control using the computation amplifier 71.

In the above-mentioned embodiment, the driver 100 includes the first driving circuit 60 that supplies a data signal to the signal supply line of the electrooptic panel 200 on the basis of the gradation data DTH [10:0], and the second driving circuit 70 electrically coupled to the signal supply line. The second driving circuit 70 includes the computation amplifier 71, the output capacitor CQ, the first feedback capacitor Cfa, and the second feedback capacitor Cfb. The computation amplifier 71 is composed of a transistor with a breakdown voltage lower than the breakdown voltage of the transistor making up the first driving circuit 60. The output capacitor CQ is provided between the output node NAMQ of the computation amplifier 71 and the signal supply line. The first feedback capacitor Cfa is provided between the inverting input node NAN of the computation amplifier 71 and the signal supply line. One end of the second feedback capacitor Cfb is coupled to the inverting input node NAN of the computation amplifier 71.

According to this embodiment, the output node NAMQ of the computation amplifier 71 and the signal supply line are coupled by the output capacitor CQ, and the inverting input node NAN of the computation amplifier 71 and the signal supply line are coupled by the first feedback capacitor Cfa. In this manner, the computation amplifier 71 and the signal supply line are DC disconnected, and thus the computation amplifier 71 can be composed of a transistor with a breakdown voltage lower than the breakdown voltage of the transistor making up the first driving circuit 60.

In addition, the voltage of the signal supply line is divided by the first feedback capacitor Cfa and the second feedback capacitor Cfb and fed back to the inverting input node NAN of the computation amplifier 71. In this manner, a voltage lower than the voltage of the signal supply line is applied to the inverting input node NAN of the computation amplifier 71, and thus the computation amplifier 71 can be composed of a transistor with a breakdown voltage lower than the breakdown voltage of the transistor making up the first driving circuit 60.

In addition, since the computation amplifier 71 is composed of a transistor with a breakdown voltage lower than the breakdown voltage of the transistor making up the first driving circuit 60, the computation amplifier 71 can be composed of a transistor with high mobility. In this manner, the frequency response characteristic and the amplification factor of the computation amplifier can both be achieved.

For example, regarding the necessity to increase the frequency response characteristic of the computation amplifier to increase the drive speed in accordance with higher resolution, the frequency response characteristic can be increased while maintaining the amplification factor of the computation amplifier, and the power consumption of the computation amplifier can be suppressed.

Note that the electrical coupling is coupling that enables transmission of an electric signal and transmission of information using an electric signal. The electrical coupling may be coupling via an active element and the like.

Note that in the above-mentioned embodiment, the D/A conversion circuit 72 is coupled to the non-inverting input node NAP of the computation amplifier 71, and the other end of the second feedback capacitor Cfb is at a constant voltage. It should be noted that this is not limitative as long as one end of the second feedback capacitor Cfb is coupled to the inverting input node NAN of the computation amplifier 71. For example, the second driving circuit 70 has a configuration of so-called capacitance DAC. Specifically, a reference voltage may be input to the non-inverting input node NAP of the computation amplifier 71, and the voltage of the other end of the second feedback capacitor Cfb may vary on the basis of the gradation data. In this case, when a voltage corresponding to certain one gradation data is applied to the other end of the second feedback capacitor Cfb, the voltage of the signal supply line is fed back through the division of the first feedback capacitor Cfa and the second feedback capacitor Cfb, and thus the same operational effect as the above-described operational effect can be achieved.

In addition, in this embodiment, the second driving circuit 70 includes the D/A conversion circuit 72. The D/A conversion circuit 72 supplies the D/A conversion voltage DAQ based on the gradation data DTL [10:0] to the inverting input node NAN of the computation amplifier 71. The other end of the second feedback capacitor Cfb is electrically coupled to a predetermined potential node.

According to this embodiment, when there is a difference between the D/A conversion voltage DAQ and the voltage VFB fed back to the inverting input node NAN of the computation amplifier 71 from the signal supply line, the computation amplifier 71 supplies a charge to the signal supply line through the output capacitor CQ, and thus the difference between the voltage of the signal supply line and the target voltage corresponding to the gradation data GD [9:0] can be corrected. In this manner, even when there is an error between the voltage output to the signal supply line by the first driving circuit 60 and the target voltage, the error can be corrected by the second driving circuit 70.

In addition, since the above-mentioned error is considered to be sufficiently small compared to the target voltage, the amount of the electric charge that should be supplied by the computation amplifier 71 can be considered to be small. As a result, the voltage change of the output node NAMQ of the computation amplifier 71 is small, and thus the computation amplifier 71 can be composed of a transistor with a breakdown voltage lower than the breakdown voltage of the transistor making up the first driving circuit 60.

In addition, in this embodiment, the capacitance of the second feedback capacitor Cfb is greater than the capacitance of the first feedback capacitor Cfa.

The gain of the second driving circuit 70 is (Cfa+Cfb)/Cfa. According to this embodiment, since the gain is greater than 2, the range of the voltage applied to the computation amplifier 71 is smaller than ½ of the voltage range of the signal supply line. In this manner, the computation amplifier 71 can be composed of a transistor with a breakdown voltage lower than the breakdown voltage of the transistor making up the first driving circuit 60.

In addition, in this embodiment, the distance between the source and the drain of the transistor making up the first driving circuit 60 is greater than the distance between the source and the drain of the transistor making up the second driving circuit 70. Alternatively, the film thickness of the gate insulating film of the transistor making up the first driving circuit 60 is greater than the film thickness of the gate insulating film of the transistor making up the second driving circuit 70.

According to this embodiment, the transistor making up the second driving circuit 70 including the computation amplifier 71 can be composed of a transistor with a breakdown voltage lower than the breakdown voltage of the transistor making up the first driving circuit 60.

In addition, in this embodiment, the driver 100 includes the initialization switch SWR. The initialization switch SWR turns on in the initialization period, and supplies the reference voltage VREF to the inverting input node NAN of the computation amplifier 71.

According to this embodiment, the inverting input node NAN of the computation amplifier 71 changes with respect to the reference voltage VREF. When the range of the D/A conversion voltage DAQ is represented by VREF−$\Delta$V1 to VREF+$\Delta$V2, it suffices to set the reference voltage VREF such that VREF−$\Delta$V1 is higher than the low-potential side power source voltage VSL of the second driving circuit 70, and that VREF+$\Delta$V2 is lower than the high-potential side power source voltage VDL of the second driving circuit 70.

In addition, in this embodiment, the first driving circuit 60 includes the capacitor driving circuit 20 and the capacitor circuit 10. The capacitor driving circuit 20 outputs first to n-th capacitor drive voltages corresponding to the gradation data DTH [10:0] to first to n-th capacitor driving nodes NDR1 to NDRn. n is an integer of 2 or more. The capacitor circuit 10 includes the first to n-th capacitors C1 to Cn provided between the signal supply line and the first to n-th capacitor driving nodes NDR1 to NDRn.

According to this embodiment, the capacitor driving circuit 20 outputs the first to n-th capacitor drive voltages corresponding to the gradation data DTH [10:0], and thus the first to n-th capacitors C1 to Cn output the charge of the electric charge amount corresponding to the gradation data DTH [10:0] to the signal supply line. In this manner, the voltage corresponding to the gradation data DTH [10:0] is output to the signal supply line. Since this driving is not feedback-controlled, errors may be caused between the voltage output through the driving and the target voltage. The second driving circuit 70 can correct the error through a feedback-control.

3. Second Embodiment

Figure 10:
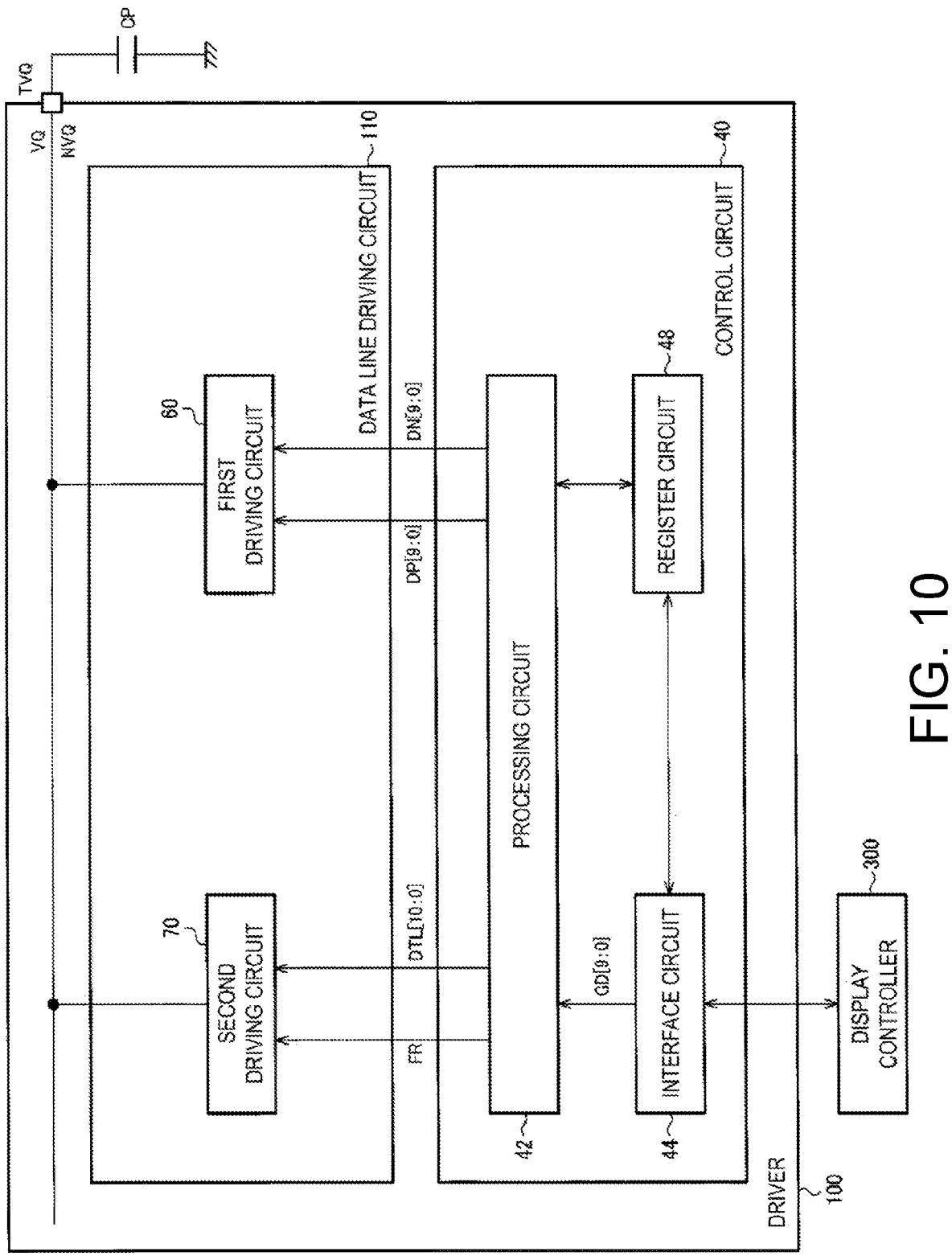
FIG. 10 illustrates a second specific configuration example of a driver.

FIG. 10 illustrates a second specific configuration example of a driver. In this configuration example, the data line driving circuit 110 includes the first driving circuit 60 and the second driving circuit 70. In addition, the processing circuit 42 outputs setting data DP [9:0], DN [9:0] for setting the driving capability of the first driving circuit 60 on the basis of the gradation data GD [9:0]. Note that the configuration and operation of the second driving circuit 70 are the same as in the first embodiment, and therefore the configuration and operation of the first driving circuit 60 are mainly described below.

Figure 11:
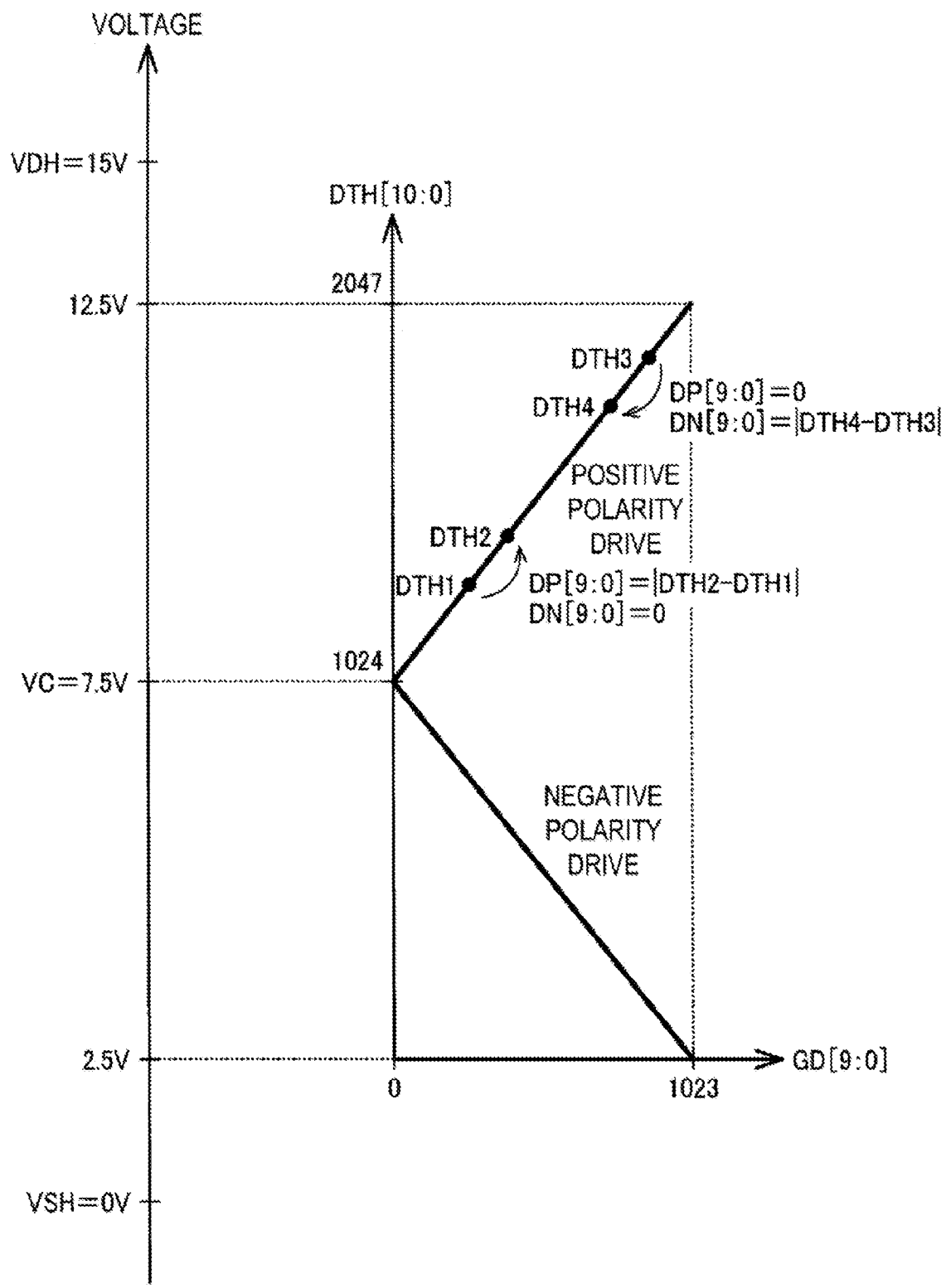
FIG. 11 is a diagram illustrating a relationship between gradation data, setting data and a data voltage.

FIG. 11 is a diagram illustrating a relationship between gradation data, setting data and a data voltage. The relationship between the gradation data GD [9:0], the gradation data DTH [10:0] and the data voltage are the same as in FIG. 3.

It is assumed that a certain pixel is driven by a gradation value DTH1, that the next pixel is driven by a gradation value DTH2, and that DTH2−DTH1>0 holds. In this case, the processing circuit 42 outputs DP [9:0]=|DTH2−DTH1|, DN [9:0]=0. It is assumed that a certain pixel is driven by a gradation value DTH3, that the next pixel is driven by a gradation value DTH4, and that DTH4−DTH3<0 holds. In this case, the processing circuit 42 outputs DP [9:0]=0, DN [9:0]=|DTH4−DTH3|. FIG. 11 illustrates an example of the positive polarity drive, but the same applies to the negative polarity drive.

Note that since DTH [10] cancels when the difference is taken, the DP [9:0] and DN [9:0] can be directly computed from the gradation data GD [9:0], not through DTH [10:0].

Figure 12:
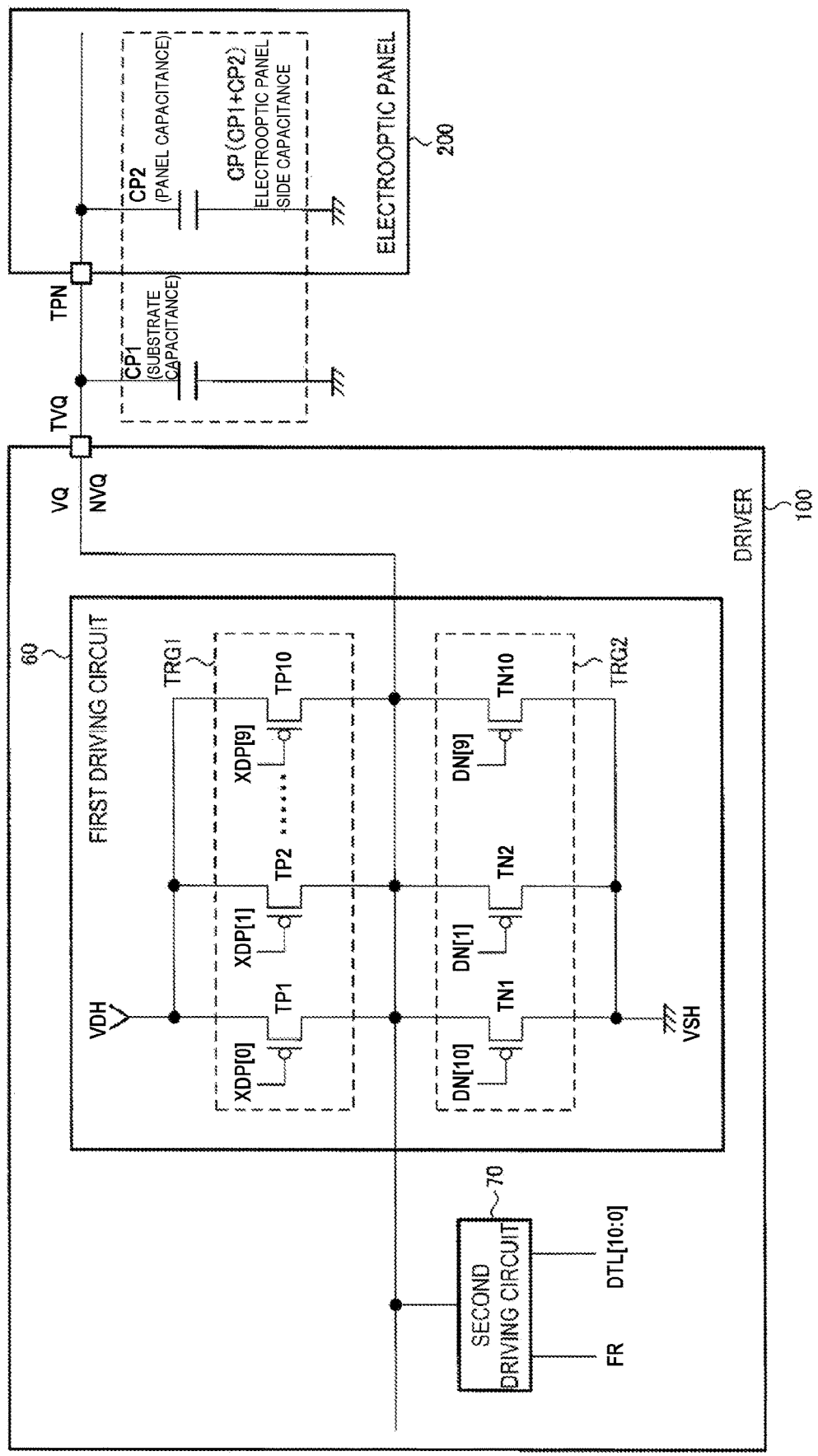
FIG. 12 illustrates a second specific configuration example of the first driving circuit.

FIG. 12 illustrates a second specific configuration example of the first driving circuit. In this configuration example, the first driving circuit 60 includes a first driving transistor group TRG1 and a second driving transistor group TRG2.

The first driving transistor group TRG1 includes P-type transistors TP1 to TP10 coupled in parallel between the node of the high-potential side power source voltage VDH and the output node NVQ. A bit signal XDP [0] is input to the gate of the P-type transistor TP1. Likewise, bit signals XDP [1] to XDP [9] are input to the gates of the P-type transistors TP2 to TP10. XDP [9:0] is data obtained through the logic inversion of each bit of the DP [9:0]. The driving capabilities of the P-type transistors TP1 to TP10 are binary weighted. Specifically, the driving capability of P-type transistor TPi is $2^{(i-1)}$ times the driving capability of the P-type transistor TP1. The driving capability is adjusted by the gate width of the transistor or the number of the unit transistors coupled in parallel, for example.

The second driving transistor group TRG2 includes N-type transistors TN1 to TN10 coupled in parallel between the output node NVQ and the low-potential side power source voltage VSH. A bit signal DN [0] is input to the gate of the N-type transistor TN1. Likewise, bit signals DN [1] to DN [9] are input to the gates of the N-type transistors TN2 to TN10. The driving capabilities of the N-type transistors TN1 to TN10 are binary weighted. Specifically, the driving capability of the N-type transistor TNi is $2^{(i-1)}$ times the driving capability of the N-type transistor TN1.

For example, the current that is supplied when the P-type transistor TP1 is on is referred to as Itp1, and the on period in which one pixel is driven is referred to as ton. The charge supplied by the P-type transistor TP1 to the output node NVQ is Itp1×ton, and the change of the output voltage VQ due to the charge is (Itp1×ton)/CP. Itp1 is set, i.e., the driving capability of the P-type transistor TP1 is set such that this voltage change corresponds to 1LSB.

Figure 13:
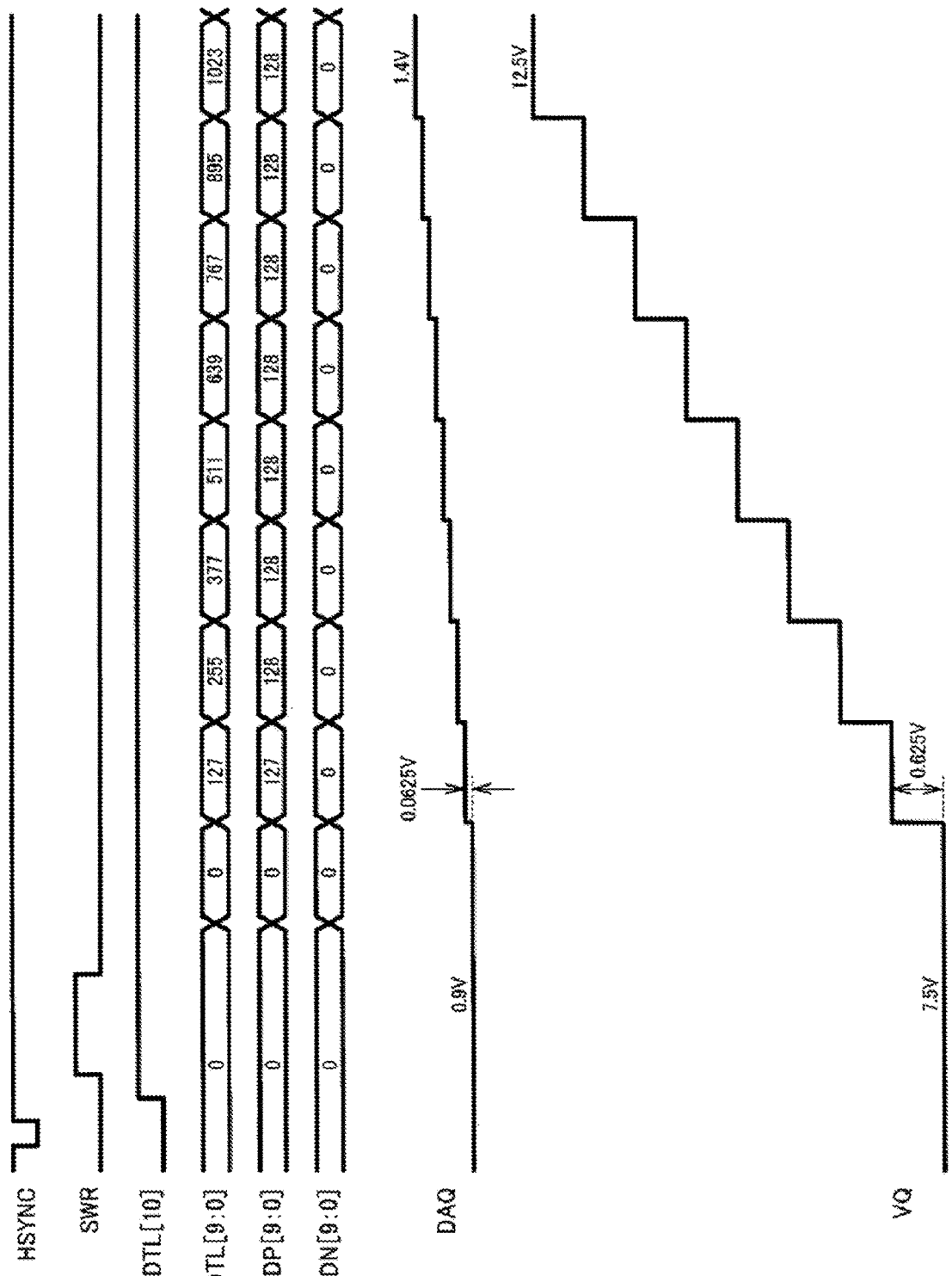
FIG. 13 illustrates a fourth waveform example for describing operations of the first driving circuit and the second driving circuit.

FIG. 13 illustrates a fourth waveform example for describing operations of the first driving circuit and the second driving circuit. FIG. 13 illustrates a waveform example of the horizontal scanning period in the positive polarity drive period.

After the horizontal scanning period is started, the processing circuit 42 outputs the DTL [9:0]=DP [9:0]=DN [9:0]=0, and sets the DTL [10] from 0 to 1. This corresponds to the DTL [10:0]=1024, and therefore the D/A conversion voltage DAQ=0.9 V and the output voltage VQ=7.5 V are obtained.

Next, the initialization switch SWR turns from off to on, and from on to off. When the initialization switch SWR is on, the voltage VFB of the inverting input node NAN of the computation amplifier 71 is initialized to the reference voltage VREF=VCL=0.9 V.

Next, writing to the pixel is started. The processing circuit 42 sequentially outputs the DTL [9:0] of the gradation values 0, 127, . . . , 1023, and sequentially outputs the DP [9:0]=0, 127, 128, . . . , 128. As a result, the D/A conversion voltage DAQ sequentially changes from 0.9 V to 1.4 V, and the output voltage VQ sequentially changes from 7.5 V to 12.5 V. Note that while FIG. 13 illustrates an example of DP [9:0]>0 and DN [9:0]=0, DP [9:0]=0 and DN [9:0]>0 are obtained in the case where the gradation value of the DTL [9:0] decreases. Note that while the gradation value for which the voltage range is easy to understand is exemplified here, the gradation value written to each pixel may be arbitrary.

For the negative polarity drive period, the illustration of the waveform is omitted. In the negative polarity drive period, the waveforms of the SWR, DTL [9:0], DP [9:0], and DN [9:0] are the same as in FIG. 13. The waveforms of the DTL [10], DAQ and VQ are the same as in FIG. 9.

In the above-mentioned embodiment, the driver 100 includes the control circuit 40 that controls the first driving circuit 60. The first driving circuit 60 includes the first driving transistor group TRG1 provided between the signal supply line and the node to which the high-potential side power source voltage VDH is supplied, and the second driving transistor group TRG2 provided between the signal supply line and the node to which the low-potential side power source voltage VSH is supplied. The control circuit 40 performs on-off control of each transistor of the first driving transistor group TRG1 or each transistor of the second driving transistor group TRG2 on the basis of the gradation data GD [9:0].

According to this embodiment, of the first driving transistor group TRG1 or the second driving transistor group TRG2, the transistor turned on based on the gradation data GD [9:0] outputs the charge of the electric charge amount corresponding to the gradation data GD [9:0] to the signal supply line. As a result, the voltage corresponding to the gradation data GD [9:0] is output to the signal supply line. Since this driving is not feedback-controlled, errors may be caused between the voltage output through the driving and the target voltage. The second driving circuit 70 can correct the error through a feedback-control.

4. Third Embodiment

In the third embodiment, the configuration and operation of the first driving circuit 60 are the same as in the first embodiment or the second embodiment. For the configuration and operation of the second driving circuit 70, differences from the first embodiment are mainly described below.

Figure 14:
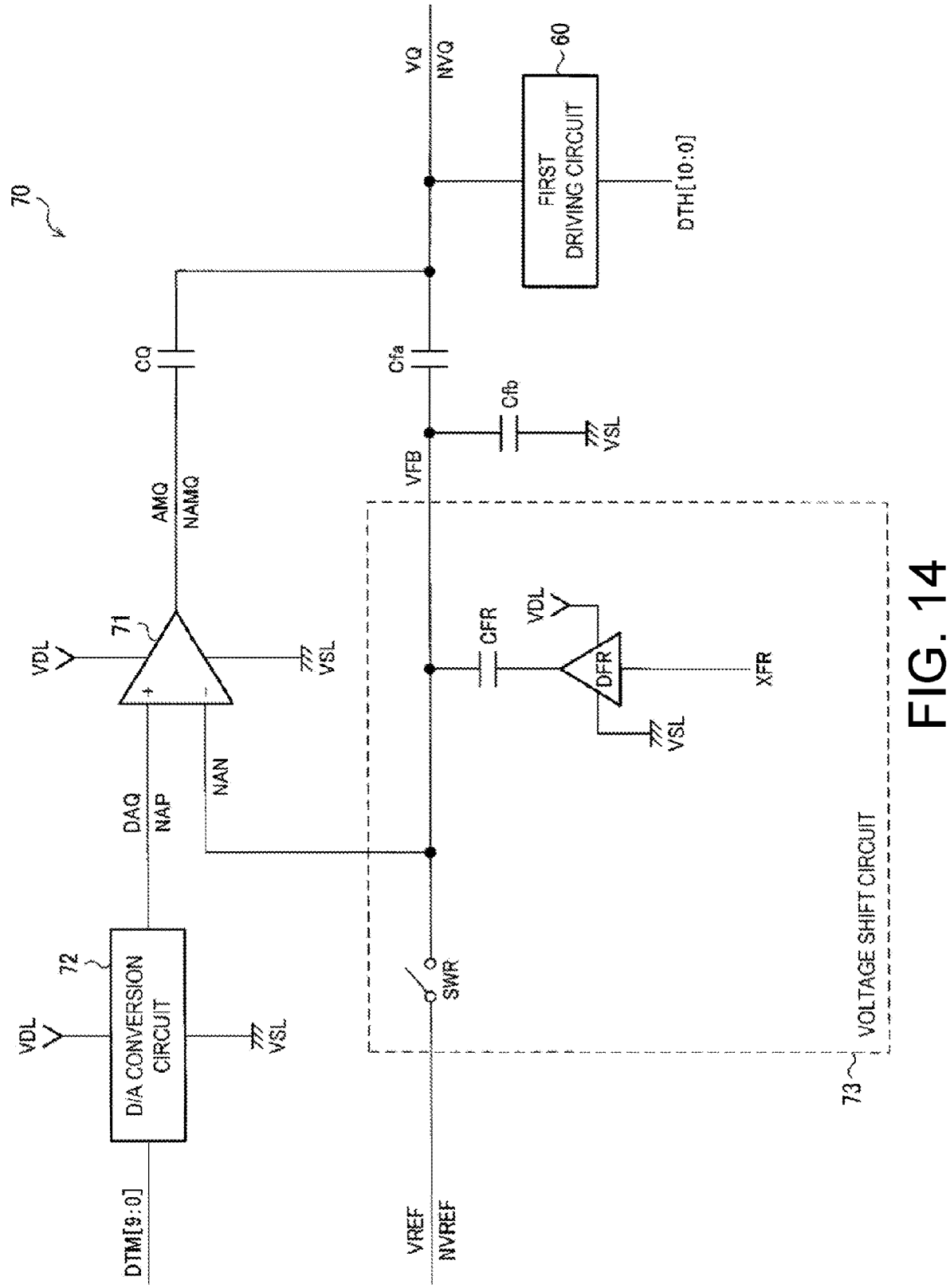
FIG. 14 illustrates a second specific configuration example of the second driving circuit.

FIG. 14 illustrates a second specific configuration example of the second driving circuit. The second driving circuit 70 includes the computation amplifier 71, the D/A conversion circuit 72, the output capacitor CQ, the first feedback capacitor Cfa, the second feedback capacitor Cfb, and a voltage shift circuit 73.

Figure 15:
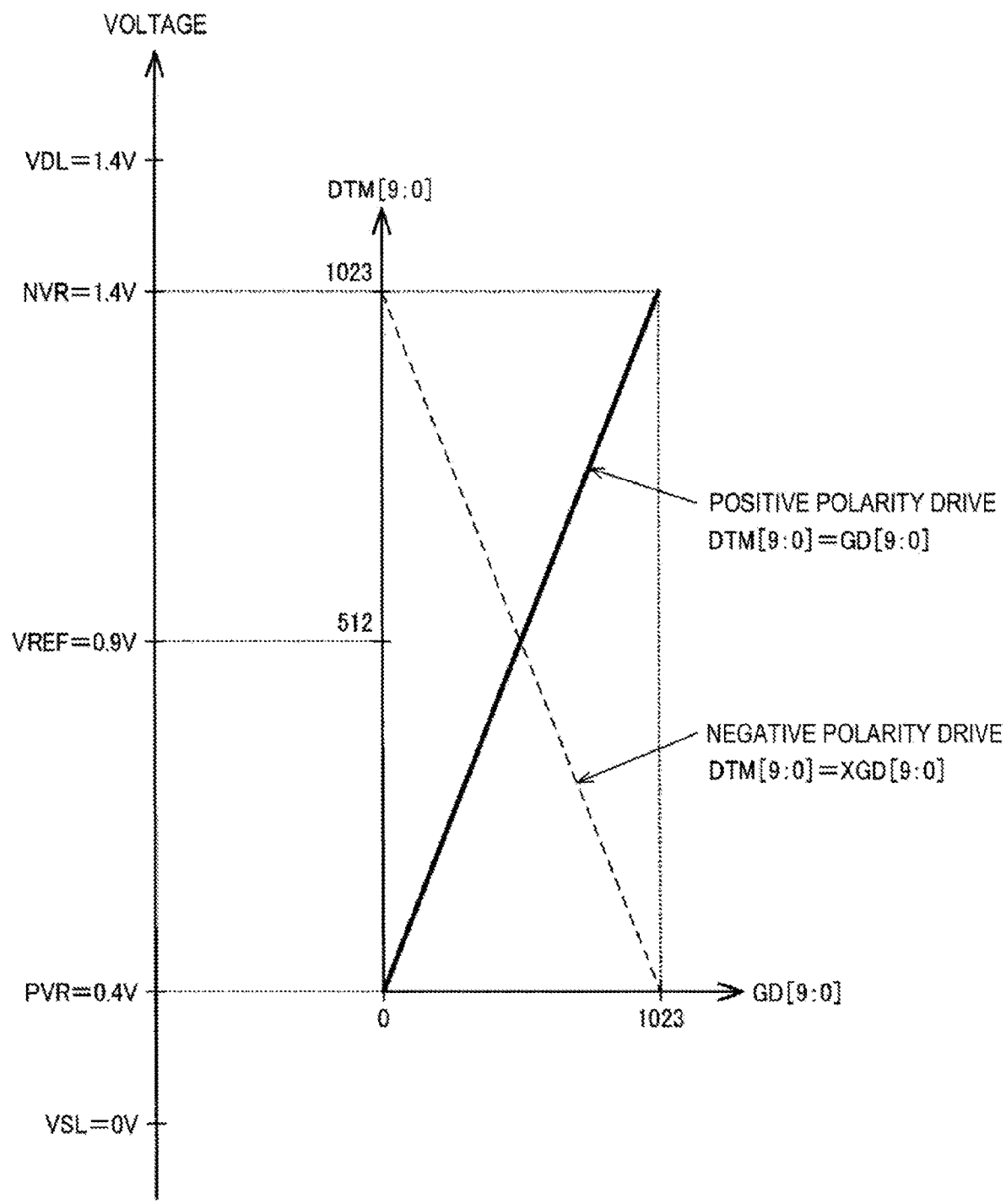
FIG. 15 illustrates a relationship between gradation data and a D/A conversion voltage.

The processing circuit 42 outputs gradation data DTM [9:0] on the basis of the gradation data GD [9:0]. The D/A conversion circuit 72 D/A-converts the gradation data DTM [9:0] into the D/A conversion voltage DAQ. FIG. 15 illustrates a relationship between gradation data and a D/A conversion voltage. The processing circuit 42 sets the DTM [9:0]=GD [9:0] in the positive polarity drive, and sets the DTM [9:0]=XGD [9:0] in the negative polarity drive. The D/A conversion circuit 72 outputs the DAQ=0.4 V to 1.4 V for the DTM [9:0]=0 to 1023.

The voltage shift circuit 73 includes the initialization switch SWR, a shifting capacitor CFR, and a voltage output circuit DFR.

One end of the shifting capacitor CFR is coupled to the inverting input node NAN of the computation amplifier 71. A signal XFR, which is a logic inversion signal of the polarity inversion signal FR, is input to the voltage output circuit DFR. The voltage output circuit DFR outputs a signal at a voltage level of VSL=0 V to the other end of the shifting capacitor CFR when the signal XFR is at the low level, and outputs a signal at a voltage level of VDL=1.8 V to the other end of the shifting capacitor CFR when the signal XFR is at the high level.

The capacitance values of the CFR, Cfb and Cfa are set such that the range of the output voltage VQ is 5 V with respect to the range 1 V of the D/A conversion voltage DAQ in each of the positive polarity drive and the negative polarity drive. In this case, since the division ratio of the Cfa and Cfb+CFR is 4:1, (Cfb+CFR)/Cfa=4 holds. In addition, the capacitance values of the CFR and Cfb are set such that the voltage VFB is changed by 0.5 V when the voltage of the other end of the shifting capacitor CFR is changed by 1.8 V. In this case, since the division ratio of the CFR and Cfb is 1.3:0.5, Cfb/CFR=1.3 V/0.5 V=2.6 holds.

Figure 16:
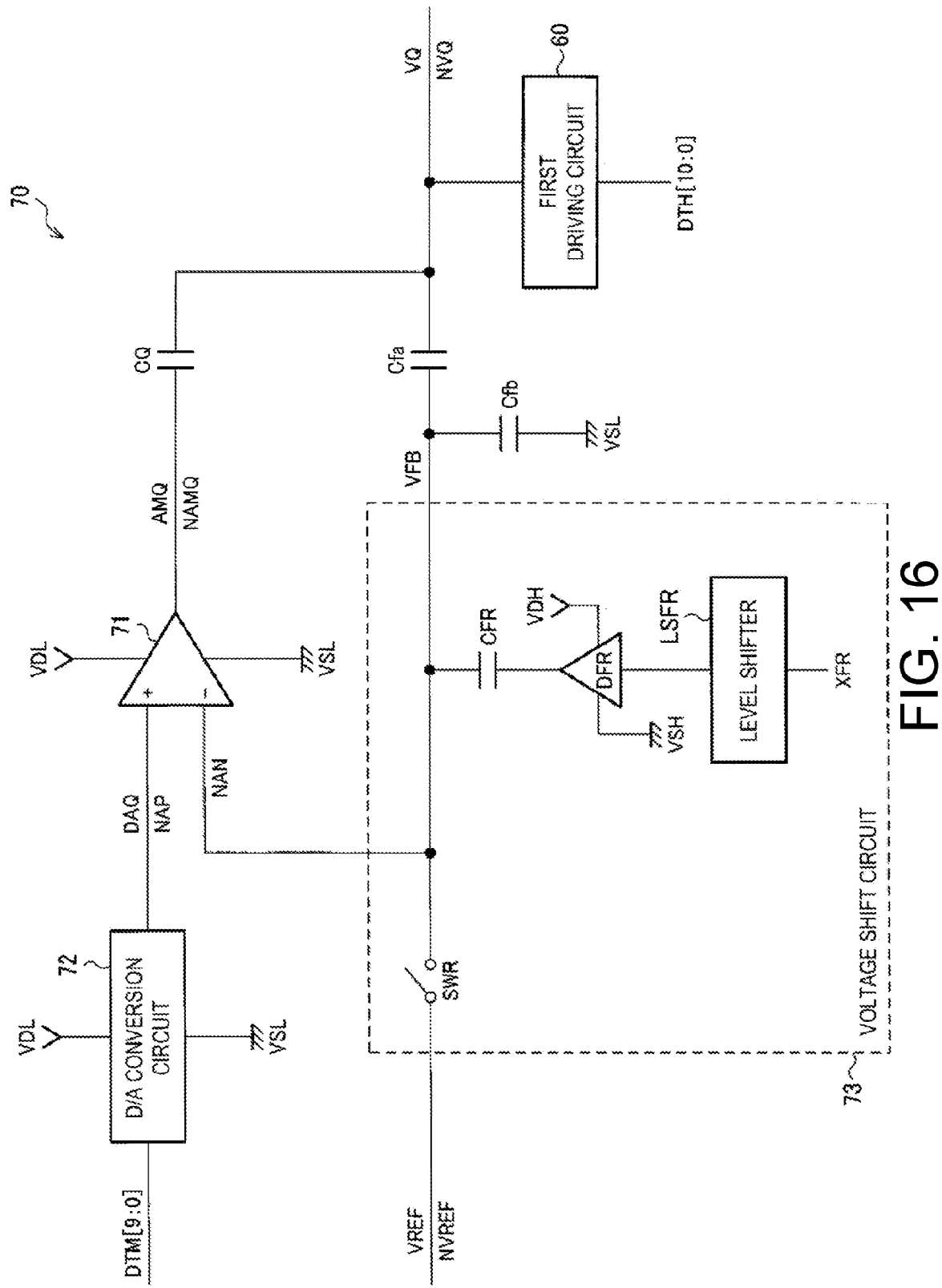
FIG. 16 illustrates a third specific configuration example of the second driving circuit.

FIG. 16 illustrates a third specific configuration example of the second driving circuit. In this configuration example, the voltage shift circuit 73 further includes a level shifter LSFR. In addition, the power source voltage of the voltage output circuit DFR is VDH and VSH.

When the signal XFR is at the low level, i.e., VSL=0 V, the level shifter LSFR outputs a signal at a voltage level of VSH=0 V, and the voltage output circuit DFR outputs the signal at a voltage level of VSH=0 V to the other end of the shifting capacitor CFR. When the signal XFR is at the high level, i.e., VDL=1.8 V, the level shifter LSFR outputs a signal at a voltage level of VDH=15 V, and the voltage output circuit DFR outputs the signal at a voltage level of VDH=15 V to the other end of the shifting capacitor CFR.

When the voltage of the other end of the shifting capacitor CFR changes by 15 V, the voltage VFB changes by 0.5 V, and therefore the division ratio of the CFR and Cfb is 14.5:0.5. Therefore, Cfb/CFR=14.5 V/0.5 V=29 holds.

Figure 17:
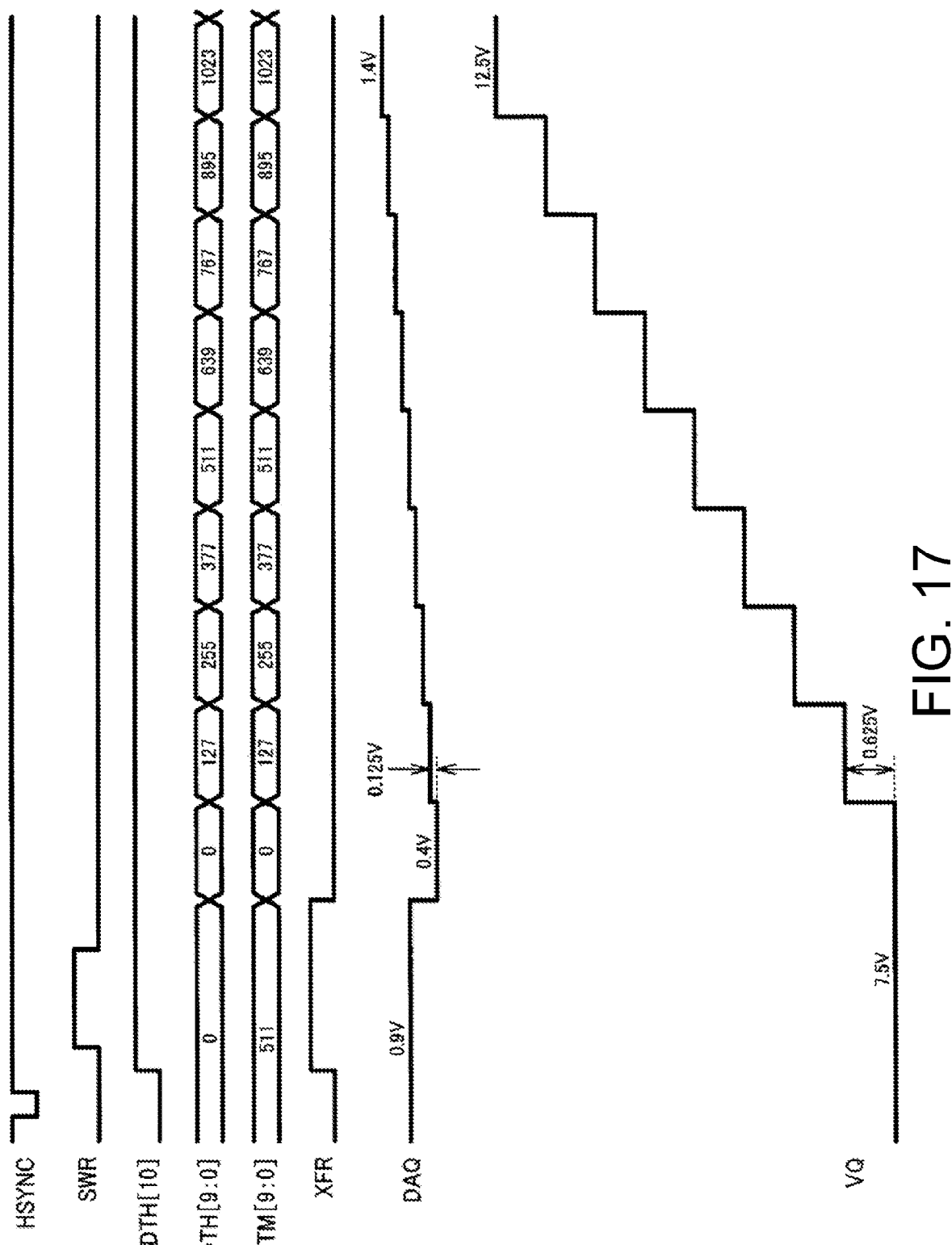
FIG. 17 illustrates a fifth waveform example for describing operations of the first driving circuit and the second driving circuit.

FIG. 17 illustrates a fifth waveform example for describing operations of the first driving circuit and the second driving circuit. FIG. 17 illustrates a waveform example of the horizontal scanning period in the positive polarity drive period.

After the horizontal scanning period is started, the processing circuit 42 outputs the DTH [9:0]=0 and the DTM [9:0]=512, and sets the DTH [10] from 0 to 1. In this case, the D/A conversion voltage DAQ=0.9 V and the output voltage VQ=7.5 V are obtained.

Next, after the signal XFR is changed from the low level to the high level, the processing circuit 42 turns the initialization switch SWR from off to on, and from on to off. When the signal XFR is at the high level and the initialization switch SWR is on, the voltage VFB of the inverting input node NAN of the computation amplifier 71 is initialized to the reference voltage VREF=VCL=0.9 V. Next, the processing circuit 42 sets the signal XFR from the high level to the low level. In this manner, the voltage VFB of the inverting input node NAN of the computation amplifier 71 is shifted from 0.9 V to 0.4 V corresponding to the positive polarity initializing voltage. Note that in FIG. 17, the period until the signal XFR is set from the high level to the low level after the initialization switch SWR turns on from off corresponds to the initialization period.

Next, writing to the pixel is started. The processing circuit 42 sequentially outputs the DTH [9:0]=DTM [9:0] of the gradation values 0, 127, . . . , 1023. In this manner, the D/A conversion voltage DAQ sequentially changes from 0.4 V to 1.4 V, and the output voltage VQ sequentially changes from 7.5 V to 12.5 V. Note that while the gradation value for which the voltage range is easy to understand is exemplified here, the gradation value written to each pixel may be arbitrary.

Figure 18:
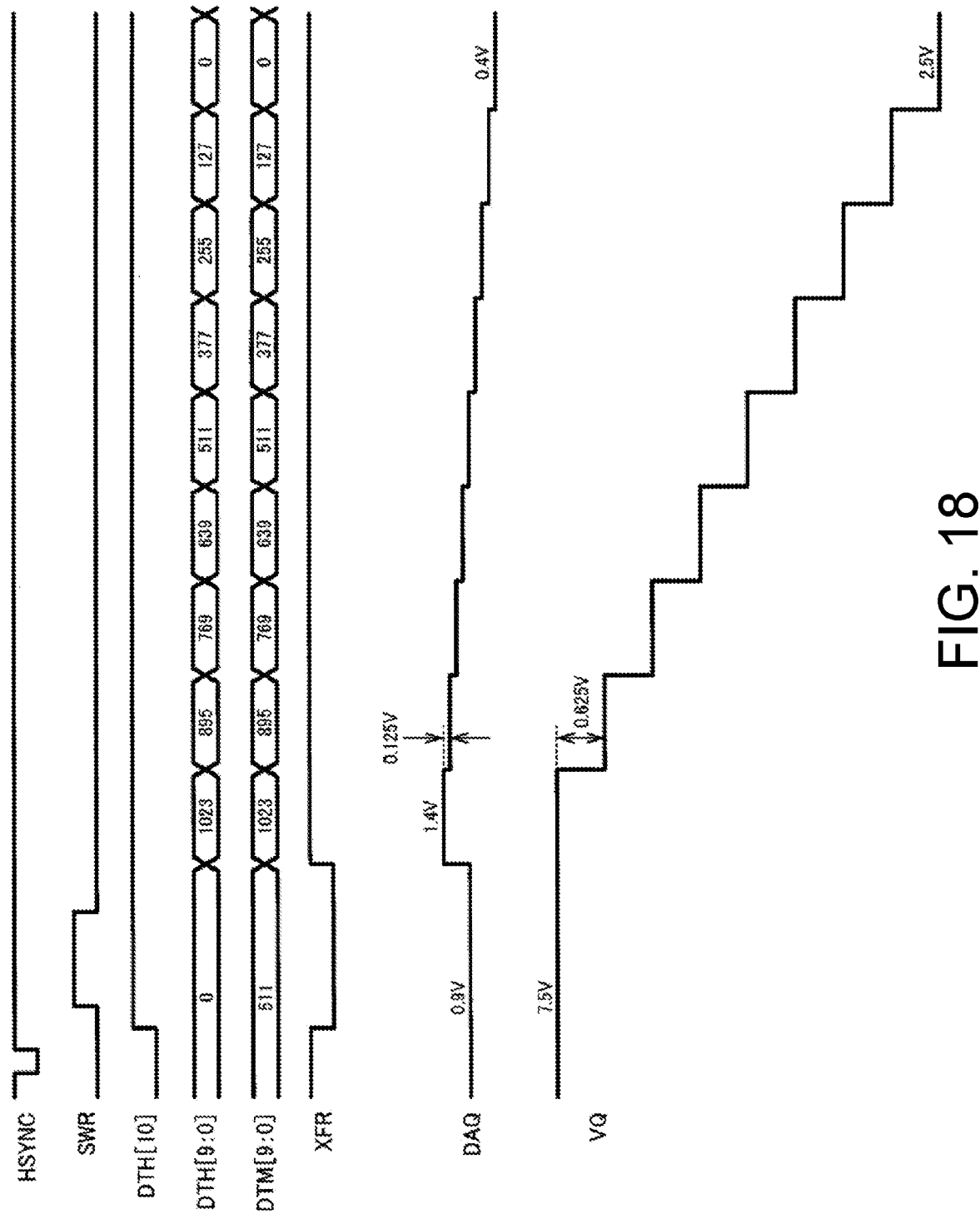
FIG. 18 illustrates a sixth waveform example for describing operations of the first driving circuit and the second driving circuit.

FIG. 18 illustrates a sixth waveform example for describing operations of the first driving circuit and the second driving circuit. FIG. 18 illustrates a waveform example of the horizontal scanning period in the negative polarity drive period.

After the horizontal scanning period is started, the processing circuit 42 outputs the DTH [9:0]=0 and the DTM [9:0]=512, and sets the DTH [10] from 0 to 1. In this case, the D/A conversion voltage DAQ=0.9 V and the output voltage VQ=7.5 V are obtained.

Next, after setting the signal XFR from the high level to the low level, the processing circuit 42 turns the initialization switch SWR from off to on, and from on to off. When the signal XFR is at the low level and the initialization switch SWR is on, the voltage VFB of the inverting input node NAN of the computation amplifier 71 is initialized to the reference voltage VREF=VCL=0.9 V. Next, the processing circuit 42 sets the signal XFR from the low level to the high level. As a result, the voltage VFB of the inverting input node NAN of the computation amplifier 71 is shifted from 0.9 V to 1.4 V corresponding to the negative polarity initializing voltage.

Next, writing to the pixel is started. After setting the DTH [10] from 1 to 0, the processing circuit 42 sequentially outputs the DTH [9:0]=DTM [9:0] of the gradation values 1023, 895, . . . , 0. As a result, the D/A conversion voltage DAQ sequentially changes from 1.4 V to 0.4 V, and the output voltage VQ sequentially changes from 7.5 V to 2.5 V. Note that while the gradation value for which the voltage range is easy to understand is exemplified here, the gradation value written to each pixel may be arbitrary.

In the above-mentioned embodiment, the driver 100 includes the voltage shift circuit 73. The voltage shift circuit 73 is electrically coupled to the inverting input node NAN of the computation amplifier 71, and shifts the voltage VFB of the inverting input node NAN.

According to this embodiment, the voltage shift circuit 73 shifts the voltage VFB of the inverting input node NAN, and thus the reference of the voltage VFB of the inverting input node NAN is shifted. By dividing the range of the output voltage VQ into a plurality of ranges and shifting the reference of the voltage VFB for each range, each range of the output voltage VQ and the range of the D/A conversion voltage DAQ can be associated with each other. In this manner, the number of gradations of the D/A conversion can be reduced while reducing the gain (Cfa+Cfb)/Cfa of the second driving circuit 70.

In addition, in this embodiment, the voltage shift circuit 73 sets, to the inverting input node NAN of the computation amplifier 71, initialization voltages that are different between the initialization period of the positive polarity drive period and the initialization period of the negative polarity drive period on the basis of the polarity inversion signal FR.

According to this embodiment, the range 0.4 V to 1.4 V of the D/A conversion voltage DAQ and the range 7.5 V to 12.5 V of the output voltage VQ in the positive polarity drive period are associated with each other, and the range 1.4 V to 0.4 V of the D/A conversion voltage DAQ and the range 7.5 V to 2.5 V of the output voltage VQ in the negative polarity drive period are associated with each other. In this manner, the gain (Cfa+Cfb)/Cfa of the second driving circuit 70 can be set to about ½, and the number of gradations of the D/A conversion can be reduced from 2048 to ½, i.e., 1024.

In addition, in this embodiment, the voltage shift circuit 73 includes the initialization switch SWR, the shifting capacitor CFR and the voltage output circuit DFR. The initialization switch SWR turns on in the initialization period, and supplies the reference voltage VREF to the inverting input node NAN of the computation amplifier 71. One end of the shifting capacitor CFR is electrically coupled to the inverting input node NAN of the computation amplifier 71. The voltage output circuit DFR outputs a voltage based on the polarity inversion signal FR to the other end of the shifting capacitor CFR in the initialization period.

According to this embodiment, the voltage output circuit DFR changes the voltage of the other end of the shifting capacitor CFR on the basis of the polarity inversion signal FR, and thus the voltage VFB of the inverting input node NAN of the computation amplifier 71 is shifted through the division of the shifting capacitor CFR and the second feedback capacitor Cfb.

5. Fourth Embodiment

In the fourth embodiment, the configuration and operation of the first driving circuit 60 are the same as in the first embodiment or the second embodiment. For the configuration and operation of the second driving circuit 70, differences from the first embodiment and the third embodiment are mainly described below.

Figure 19:
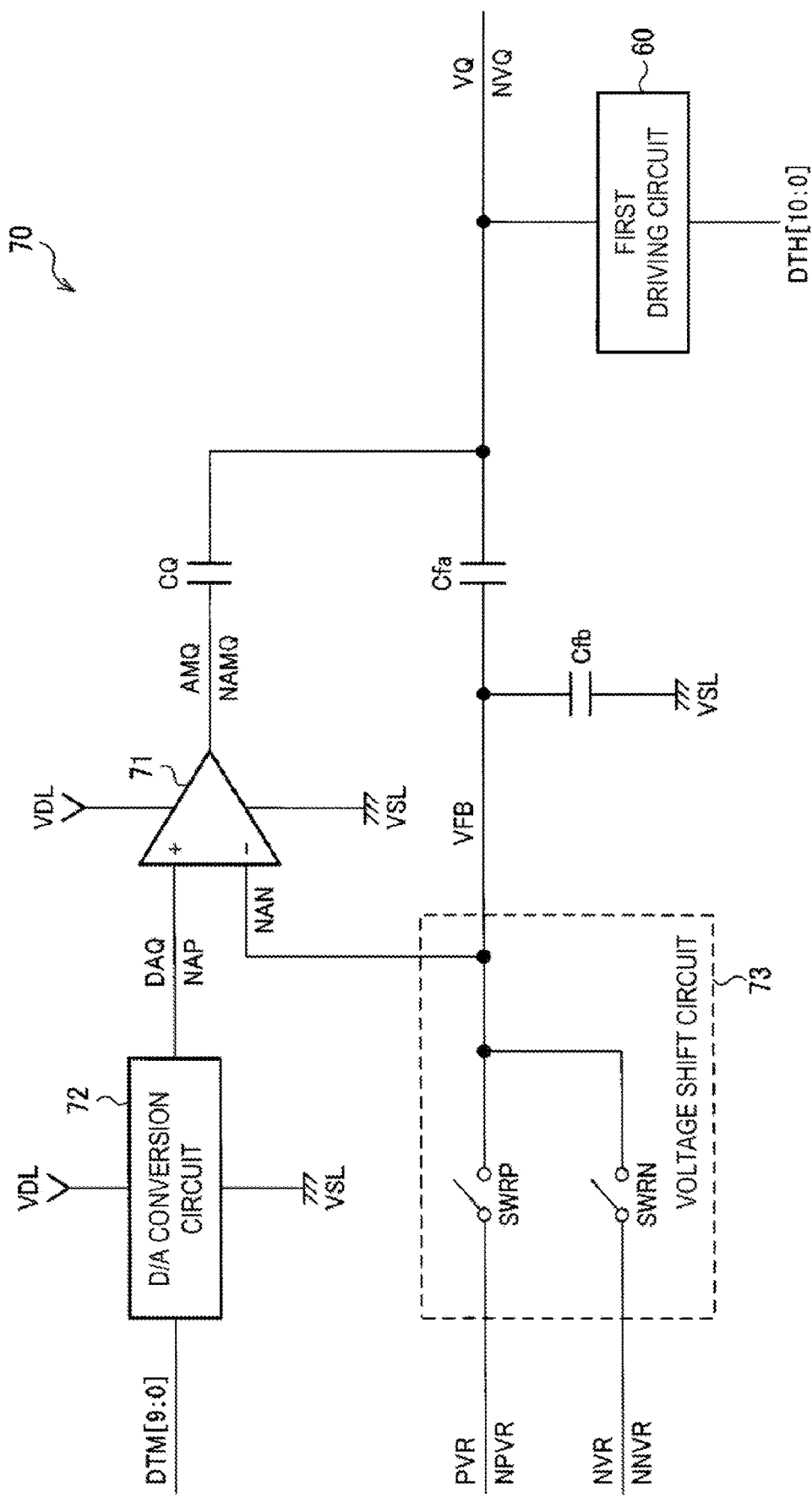
FIG. 19 illustrates a fourth specific configuration example of the second driving circuit.

FIG. 19 illustrates a fourth specific configuration example of the second driving circuit. In this configuration example, the voltage shift circuit 73 includes a first initialization switch SWRP and a second initialization switch SWRN.

One end of the first initialization switch SWRP is coupled to the inverting input node NAN of the computation amplifier 71, and the other end is coupled to a node NPVR to which a positive polarity initializing voltage PVR is supplied. One end of the second initialization switch SWRN is coupled to the inverting input node NAN of the computation amplifier 71, and the other end is coupled to a node NNVR to which a negative polarity initializing voltage NVR is supplied. The initialization voltages PVR and NVR are supplied to the nodes NPVR and NNVR from a voltage generation circuit not illustrated in the drawing included in the driver 100, for example.

Figure 20:
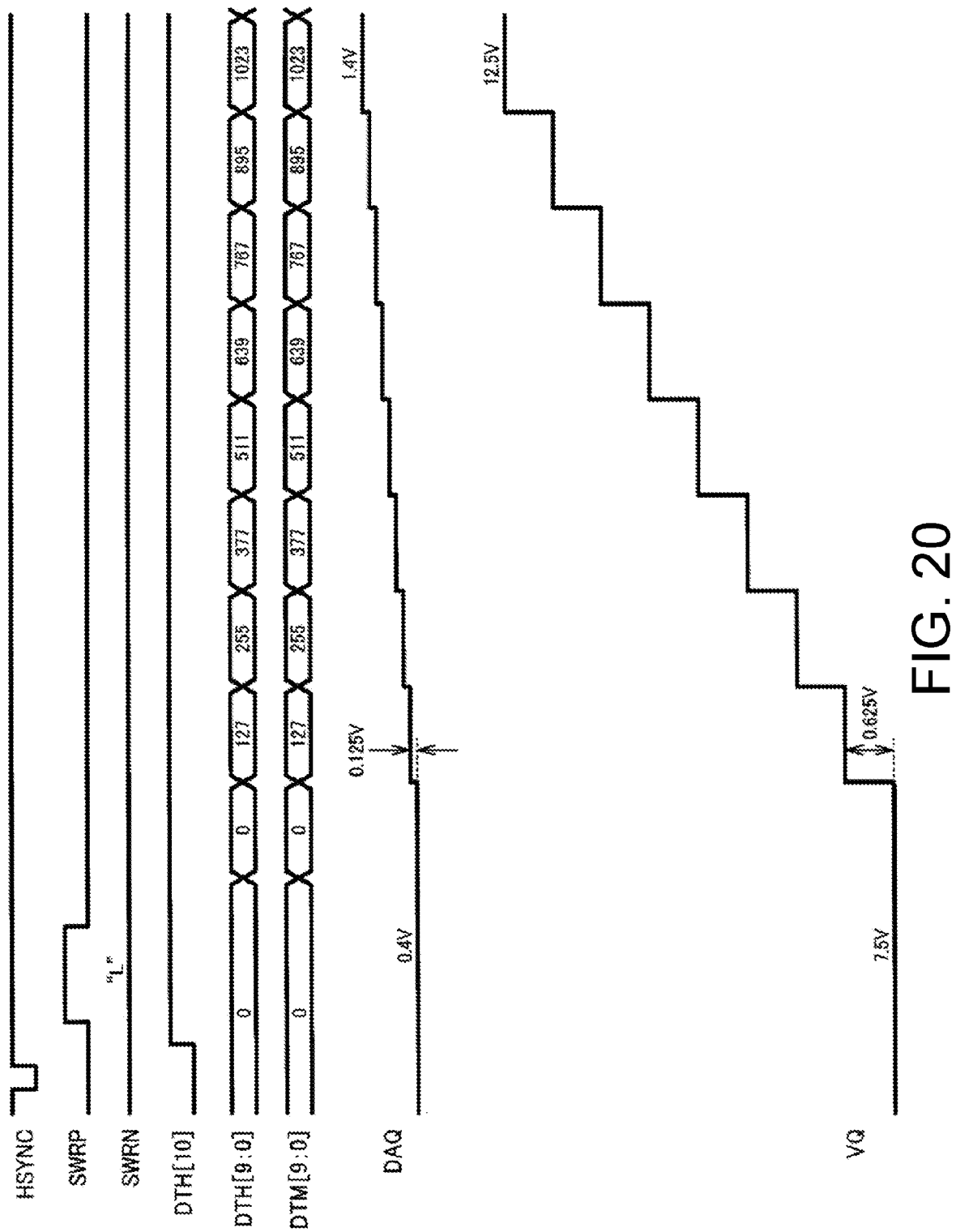
FIG. 20 illustrates a seventh waveform example for describing operations of the first driving circuit and the second driving circuit.

FIG. 20 illustrates a seventh waveform example for describing operations of the first driving circuit and the second driving circuit. FIG. 20 illustrates a waveform example of the horizontal scanning period in the positive polarity drive period.

After the horizontal scanning period is started, the processing circuit 42 outputs the DTH [9:0]=0 and the DTM [9:0]=0, and sets the DTH [10] from 0 to 1. In this case, the D/A conversion voltage DAQ=0.4 V and the output voltage VQ=7.5 V are obtained.

Next, the processing circuit 42 turns the first initialization switch SWRP from off to on, and from on to off. The second initialization switch SWRN is maintained off. When the first initialization switch SWRP is on, the voltage VFB of the inverting input node NAN of the computation amplifier 71 is initialized to the positive polarity initializing voltage PVR=0.4 V. Note that in FIG. 20, the period in which the first initialization switch SWRP is on corresponds to the initialization period.

Next, writing to the pixel is started. The processing circuit 42 sequentially outputs the DTH [9:0]=DTM [9:0] of the gradation values 0, 127, . . . , 1023. In this manner, the D/A conversion voltage DAQ sequentially changes from 0.4 V to 1.4 V, and the output voltage VQ sequentially changes from 7.5 V to 12.5 V. Note that while the gradation value for which the voltage range is easy to understand is exemplified here, the gradation value written to each pixel may be arbitrary.

Figure 21:
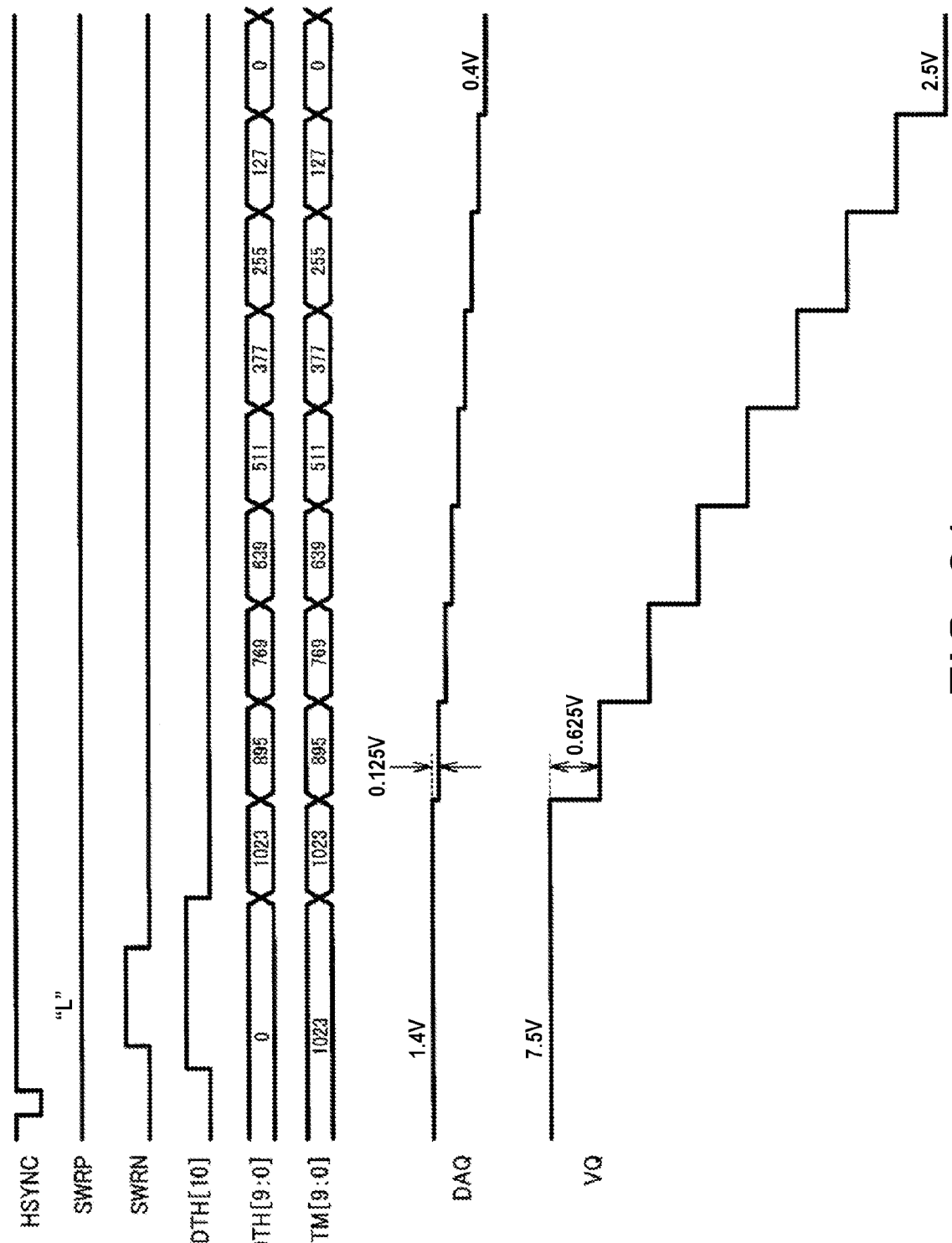
FIG. 21 illustrates an eighth waveform example for describing operations of the first driving circuit and the second driving circuit.

FIG. 21 illustrates an eighth waveform example for describing operations of the first driving circuit and the second driving circuit. FIG. 21 illustrates a waveform example of the horizontal scanning period in the negative polarity drive period.

After the horizontal scanning period is started, the processing circuit 42 outputs the DTH [9:0]=0 and the DTM [9:0]=1023, and sets the DTH [10] from 0 to 1. In this case, the D/A conversion voltage DAQ=1.4 V and the output voltage VQ=7.5 V are obtained.

Next, the processing circuit 42 turns the second initialization switch SWRN from off to on, and from on to off. The first initialization switch SWRP is maintained off. When the second initialization switch SWRN is on, the voltage VFB of the inverting input node NAN of the computation amplifier 71 is initialized to the negative polarity initializing voltage NVR=1.4 V. Note that in FIG. 21, the period in which the second initialization switch SWRN is on is the initialization period.

Next, writing to the pixel is started. The processing circuit 42 sequentially outputs the DTH [9:0]=DTM [9:0] of the gradation values 1023, 895, . . . , 0. As a result, the D/A conversion voltage DAQ sequentially changes from 1.4 V to 0.4 V, and the output voltage VQ sequentially changes from 7.5 V to 2.5 V. Note that while the gradation value for which the voltage range is easy to understand is exemplified here, the gradation value written to each pixel may be arbitrary.

In the above-mentioned embodiment, the voltage shift circuit 73 includes the first initialization switch SWRP that supplies the positive polarity initializing voltage PVR to the inverting input node NAN of the computation amplifier 71 in the initialization period of the positive electrode drive period, and the second initialization switch SWRN that supplies the negative polarity initializing voltage NVR to the inverting input node NAN of the computation amplifier 71 in the initialization period of the negative electrode drive period.

According to this embodiment, initialization voltages that are different between the initialization period of the positive polarity drive period and the initialization period of the negative polarity drive period are set to the inverting input node NAN of the computation amplifier 71. In this manner, the gain (Cfa+Cfb)/Cfa of the second driving circuit 70 can be reduced to about ½, and the number of gradations of the D/A conversion can be reduced from 2048 to ½, i.e., 1024.

6. Fifth Embodiment

In the fifth embodiment, the configuration and operation of the first driving circuit 60 are the same as in the first embodiment or the second embodiment. For the configuration and operation of the second driving circuit 70, differences from the first embodiment and the third embodiment are mainly described below.

Figure 22:
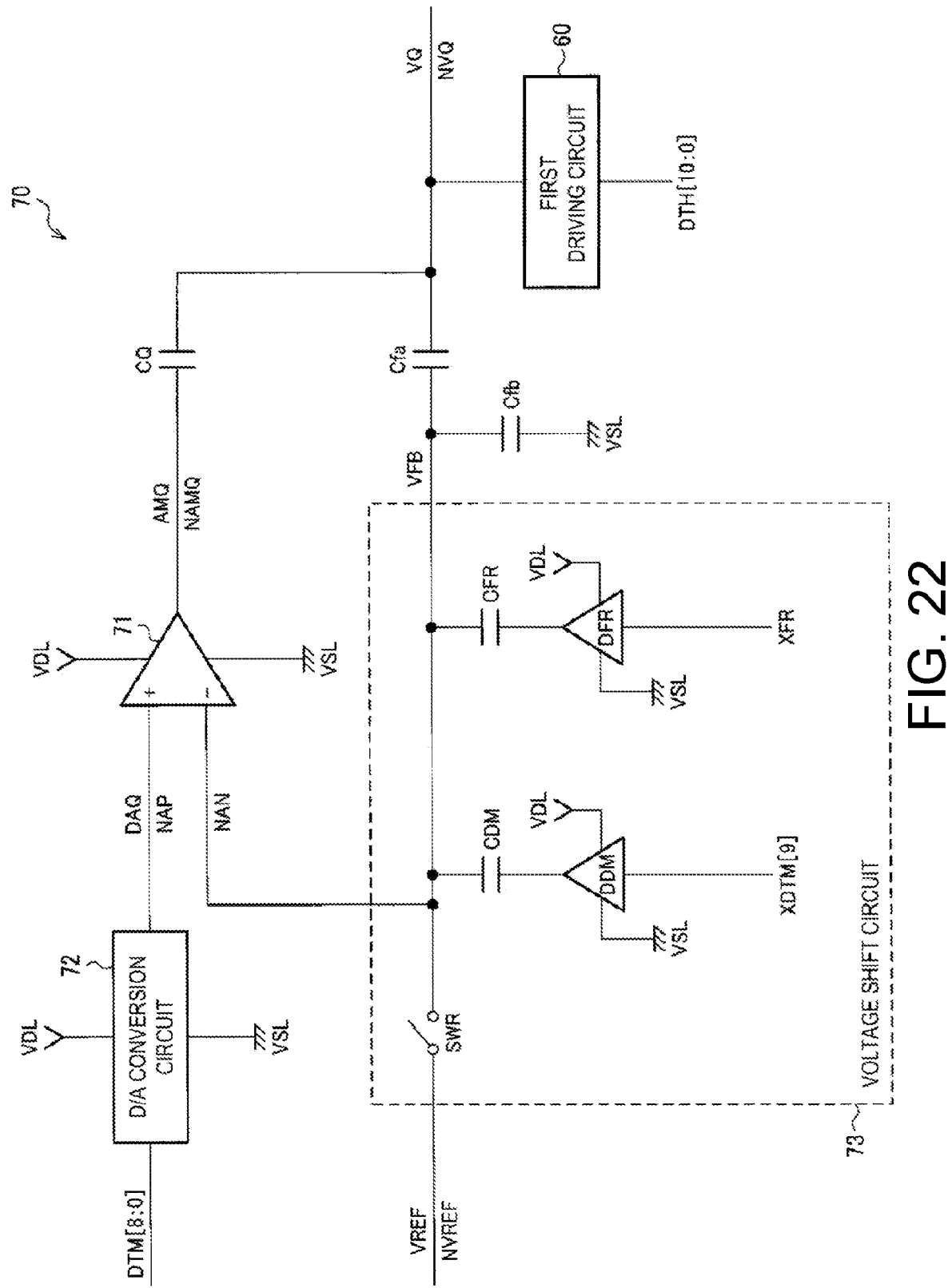
FIG. 22 illustrates a fifth specific configuration example of the second driving circuit.

FIG. 22 illustrates a fifth specific configuration example of the second driving circuit. In this configuration example, the voltage shift circuit 73 includes the initialization switch SWR, a first shifting capacitor CFR, a first voltage output circuit DFR, a second shifting capacitor CDM, and a second voltage output circuit DDM.

A lower-level bit DTM [8:0] of the gradation data DTM [9:0] is input to the D/A conversion circuit 72. The D/A conversion circuit 72 D/A-converts the lower-level bit DTM [8:0] into the D/A conversion voltage DAQ.

One end of the second shifting capacitor CDM is coupled to the inverting input node NAN of the computation amplifier 71. A signal XDTM [9], which is a logic inversion signal of a higher-level bit DTM [9] of the gradation data DTM [9:0], is input to the second voltage output circuit DDM. The second voltage output circuit DDM outputs a signal at a voltage level of VSL=0 V to the other end of the second shifting capacitor CDM when the signal XDTM [9] is at the low level, and outputs a signal at a voltage level of VDL=1.8 V to the other end of the second shifting capacitor CDM when the signal XDTM [9] is at the high level.

The capacitance values of CDM, CFR, Cfb and Cfa are set such that the range of the output voltage VQ is 10 V/4=2.5 V with respect to the range 1 V of the D/A conversion voltage DAQ. In this case, since the division ratio of Cfa and Cfb+CFR+CDM is 1.5:1, (Cfb+CFR+CDM)/Cfa=1.5 holds. In addition, the capacitance values of CDM, CFR and Cfb are set such that the voltage VFB is changed by 0.5 V when the voltage of the other end of the first shifting capacitor CFR is changed by 1.8 V. In this case, since the division ratio of CFR and Cfb+CDM is 1.3:0.5, (Cfb+CDM)/CFR=1.3 V/0.5 V=2.6 holds. In addition, the capacitance values of CDM, CFR and Cfb are set such that the voltage VFB is changed by 1.0 V when the voltage of the other end of the second shifting capacitor CDM is changed by 1.8 V. In this case, since the division ratio of CDM and Cfb+CFR is 0.8:1, (Cfb+CFR)/CDM=0.8 V/1 V=0.8 holds.

Figure 23:
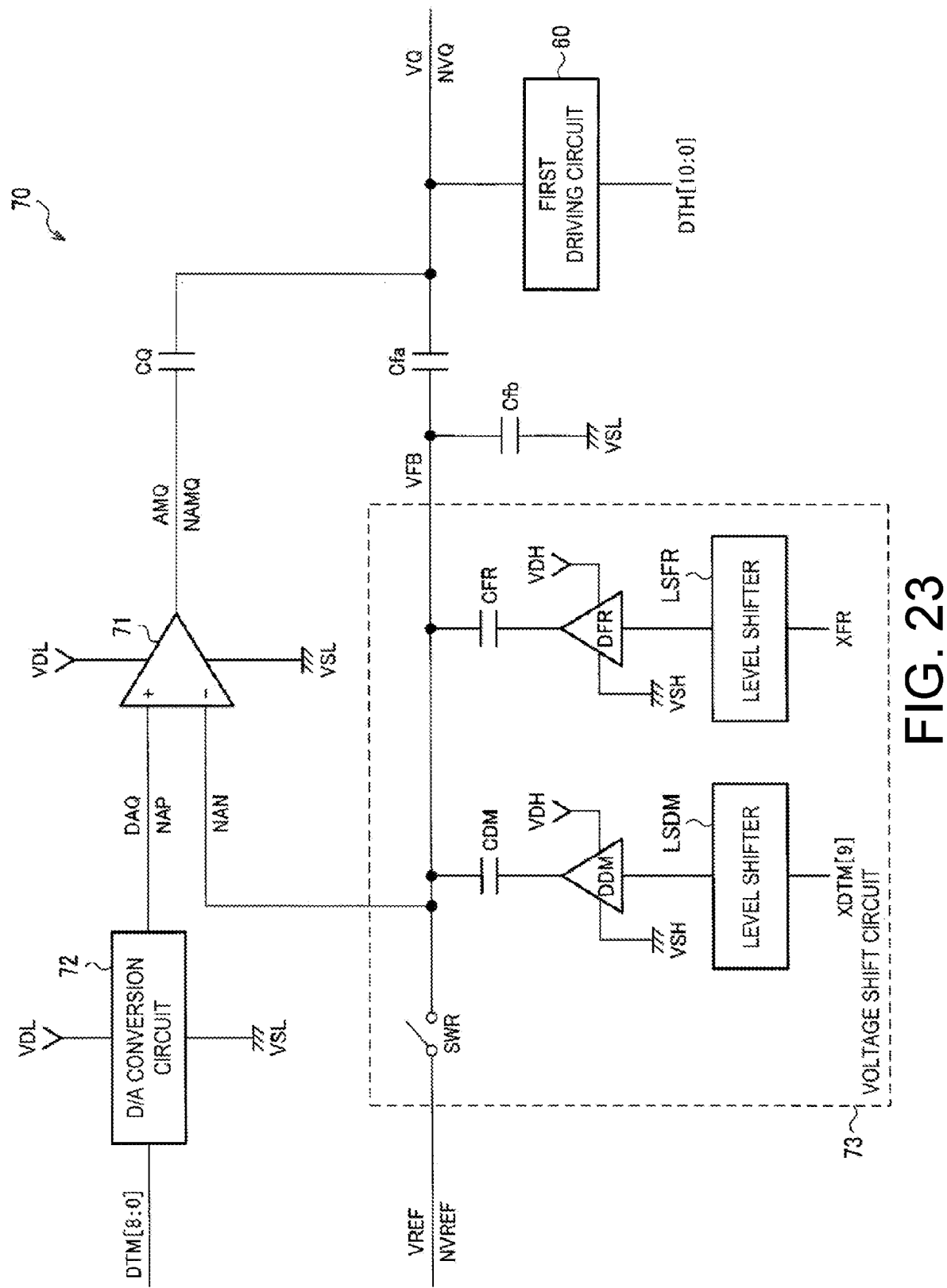
FIG. 23 illustrates a sixth specific configuration example of the second driving circuit.

FIG. 23 illustrates a sixth specific configuration example of the second driving circuit. In this configuration example, the voltage shift circuit 73 further includes a first level shifter LSFR and a second level shifter LSDM. In addition, the power source voltages of the first voltage output circuit DFR and the second voltage output circuit DDM are VDH and VSH. The operations of the level shifters and the voltage output circuit are the same as the operations of the level shifter and the voltage output circuit of FIG. 16, and therefore the description thereof is omitted.

Figure 24:
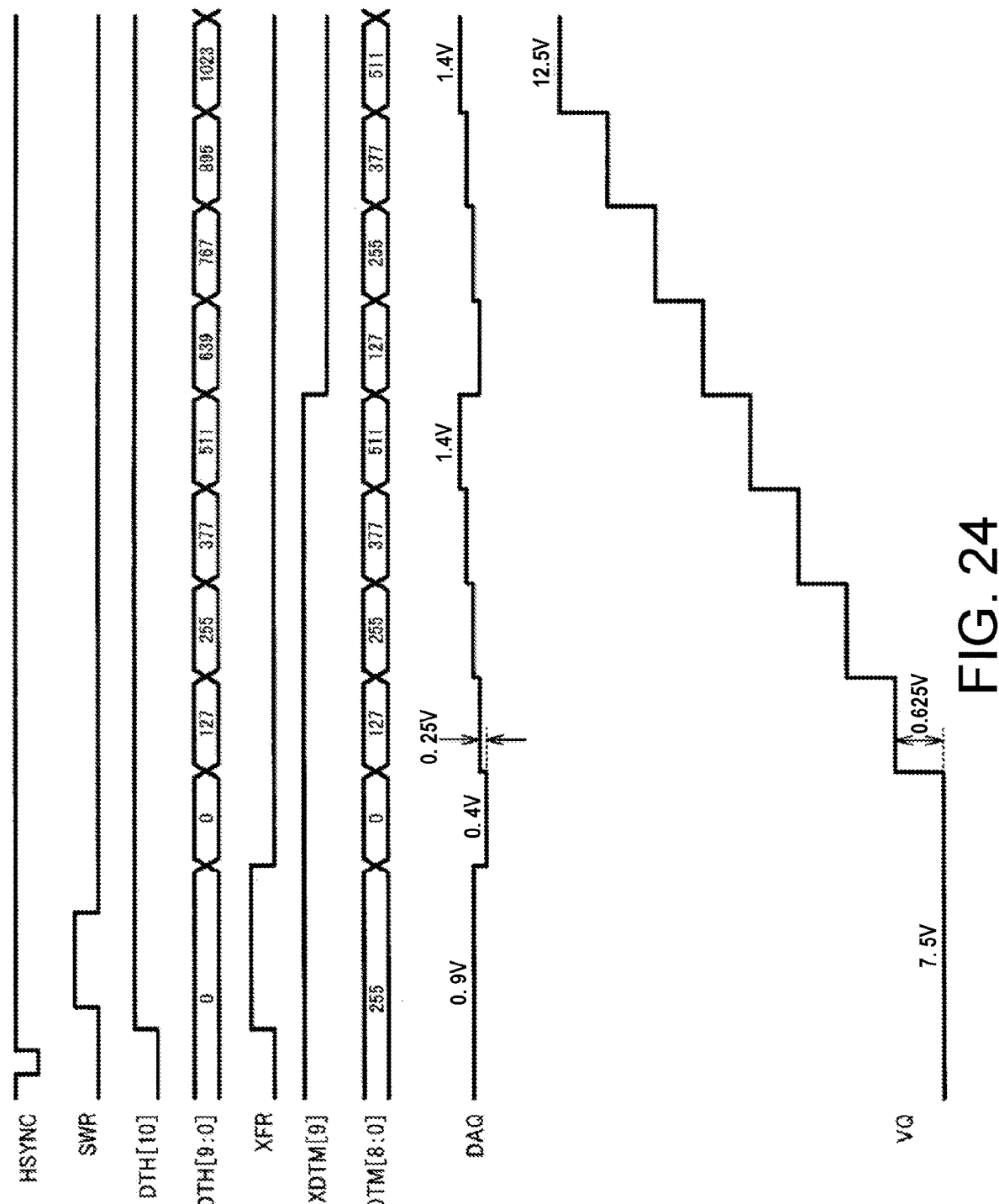
FIG. 24 illustrates a ninth waveform example for describing operations of the first driving circuit and the second driving circuit.

FIG. 24 illustrates a ninth waveform example for describing operations of the first driving circuit and the second driving circuit. FIG. 24 illustrates a waveform example of the horizontal scanning period in the positive polarity drive period.

After the horizontal scanning period is started, the processing circuit 42 outputs the DTH [9:0]=0, the DTM [8:0]=255 and the XDTM [9]=1, and sets the DTH [10] from 0 to 1. In this case, the D/A conversion voltage DAQ=0.9 V and the output voltage VQ=7.5 V are obtained.

Next, after the signal XFR is changed from the low level to the high level, the processing circuit 42 turns the initialization switch SWR from off to on, and from on to off. When the signal XFR is at the high level and the initialization switch SWR is on, the voltage VFB of the inverting input node NAN of the computation amplifier 71 is initialized to the reference voltage VREF=VCL=0.9 V. Next, the processing circuit 42 sets the signal XFR from the high level to the low level. In this manner, the voltage VFB of the inverting input node NAN of the computation amplifier 71 is shifted from 0.9 V to 0.4 V.

Next, writing to the pixel is started. The processing circuit 42 sequentially outputs the DTH [9:0]=DTM [9:0] of the gradation values 0, 127, 255, 377, 511. In this case, the XDTM [9]=1 and the DTM [8:0]=0, 127, 255, 377, 511 are obtained. In this manner, the D/A conversion voltage DAQ sequentially changes from 0.4 V to 1.4 V, and the output voltage VQ sequentially changes from 7.5 V to 10.0 V.

The processing circuit 42 sets the signal XDTM [9] from the high level to the low level. As a result, the voltage VFB of the inverting input node NAN of the computation amplifier 71 is shifted from 1.4 V to 0.4 V. It should be noted that since the gradation value for the next pixel is the DTH [9:0]=637, the VQ=10.0 V+0.625 V is obtained, and the VFB=0.4 V+0.625/2.5=0.4 V+0.25 V is obtained through the division of the feedback capacitor. In addition, since the DTM [8:0]=127, the DAQ=0.4 V+0.25 V is obtained.

After changing the signal XDTM [9] from the high level to the low level, the processing circuit 42 outputs the DTH [9:0]=DTM [9:0] of the gradation values 639, 767, 895, 1023. In this case, the XDTM [9]=0 and the DTM [8:0]=127, 255, 377, 511 are obtained. In this manner, the D/A conversion voltage DAQ sequentially changes from 0.65 V to 1.4 V, and the output voltage VQ sequentially changes from 10.625 V to 10.0 V. Thus, the output voltage VQ sequentially changes from 7.5 V to 12.5 V for the DTH [9:0] of the gradation values 0, 127, . . . , 1023. Note that while the gradation value for which the voltage range is easy to understand is exemplified here, the gradation value written to each pixel may be arbitrary.

Figure 25:
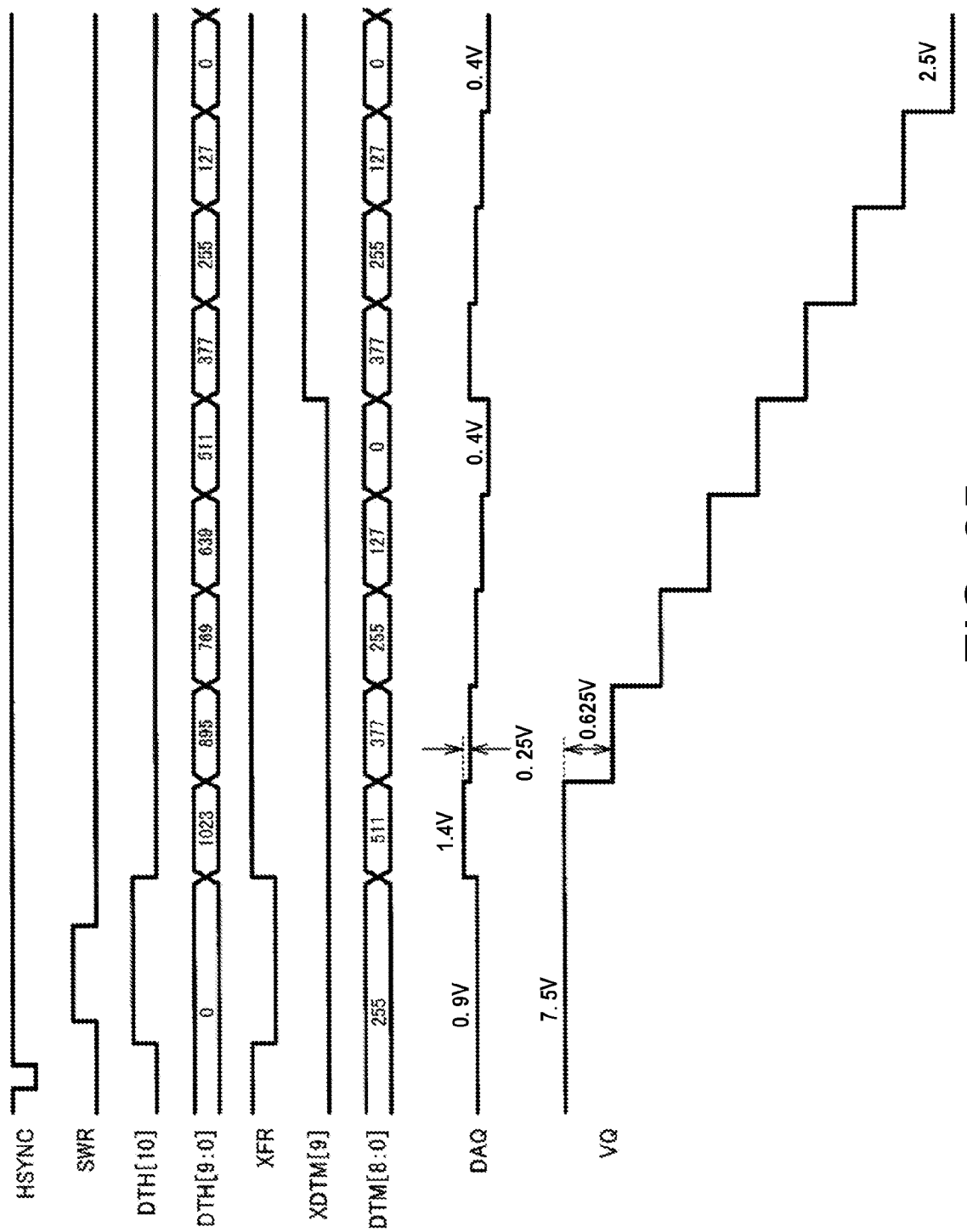
FIG. 25 illustrates a tenth waveform example for describing operations of the first driving circuit and the second driving circuit.

FIG. 25 illustrates a tenth waveform example for describing operations of the first driving circuit and the second driving circuit. FIG. 25 illustrates a waveform example of the horizontal scanning period in the negative polarity drive period.

After the horizontal scanning period is started, the processing circuit 42 outputs the DTH [9:0]=0, the DTM [8:0]=255, and the XDTM [9]=0, and sets the DTH [10] from 0 to 1. In this case, the D/A conversion voltage DAQ=0.9 V and the output voltage VQ=7.5 V are obtained.

Next, after setting the signal XFR from the high level to the low level, the processing circuit 42 turns the initialization switch SWR from off to on, and from on to off. When the signal XFR is at the low level and the initialization switch SWR is on, the voltage VFB of the inverting input node NAN of the computation amplifier 71 is initialized to the reference voltage VREF=VCL=0.9 V. Next, the processing circuit 42 sets the signal XFR from the low level to the high level. In this manner, the voltage VFB of the inverting input node NAN of the computation amplifier 71 is shifted from 0.9 V to 1.4 V.

Next, writing to the pixel is started. The processing circuit 42 sets the DTH [10] from 1 to 0. The processing circuit 42 sequentially outputs the DTH [9:0]=DTM [9:0] of the gradation values 1023, 895, 767, 639, 511. In this case, the XDTM [9]=0 and the DTM [8:0]=511, 377, 255, 127, 0 are obtained. As a result, the D/A conversion voltage DAQ sequentially changes from 1.4 V to 0.4 V, and the output voltage VQ sequentially changes from 7.5 V to 5.0 V.

When the DTM [9:0] changes from 511 or smaller to 512 or greater, the signal XDTM [9] changes from the low level to the high level. In this manner, the voltage VFB of the inverting input node NAN of the computation amplifier 71 is shifted from 0.4 V to 1.4 V. It should be noted that since the gradation value for the next pixel is the DTH [9:0]=377, VQ=5.0 V−0.625 V, VFB=1.4 V−0.625/2.5=1.4 V−0.25 V is obtained through the division of the feedback capacitor. In addition, since the DTM [8:0]=377 is obtained, the DAQ=1.4 V−0.25 V is obtained.

The processing circuit 42 sequentially outputs the DTH [9:0]=DTM [9:0] of the gradation values 377, 255, 127, 0. In this case, the XDTM [9]=1 and the DTM [8:0]=377, 255, 127, 0 are obtained. In this manner, the D/A conversion voltage DAQ sequentially changes from 1.15 V to 0.4 V, and the output voltage VQ sequentially changes from 4.375 V to 2.5 V. Thus, the output voltage VQ sequentially changes from 7.5 V to 2.5 V for the DTH [9:0] of the gradation values 1023, 895, . . . , 0. Note that while the gradation value for which the voltage range is easy to understand is exemplified here, the gradation value written to each pixel may be arbitrary.

In the above-mentioned embodiment, the voltage shift circuit 73 shifts the voltage of the inverting input node NAN of the computation amplifier 71 on the basis of the polarity inversion signal FR and the higher-level bit DTM [9] of the gradation data DTM [9:0].

According to this embodiment, the range 2.5 V to 12.5 V of the output voltage VQ is divided into four ranges of 2.5 V to 5 V, 5 V to 7.5 V, 7.5 V to 10 V, and 10 V to 12.5 V, and each range and the range 0.4 V to 1.4 V of the D/A conversion voltage DAQ are associated with each other. In this manner, the gain (Cfa+Cfb)/Cfa of the second driving circuit 70 can be reduced to about ¼, and the number of gradations of the D/A conversion 2048 can be reduced to ¼, 512.

In addition, in this embodiment, the voltage shift circuit 73 includes the initialization switch SWR, the first shifting capacitor CFR, the first voltage output circuit DFR, the second shifting capacitor CDM, and the second voltage output circuit DDM. The initialization switch SWR turns on in the initialization period, and supplies the reference voltage VREF to the inverting input node NAN of the computation amplifier 71. One end of the first shifting capacitor CFR is electrically coupled to the inverting input node NAN of the computation amplifier 71. In the initialization period, the first voltage output circuit DFR outputs a voltage based on the polarity inversion signal FR to the other end of the first shifting capacitor CFR. One end of the second shifting capacitor CDM is electrically coupled to the inverting input node NAN of the computation amplifier 71. The second voltage output circuit DDM outputs a voltage based on the higher-level bit DTM [9] of the gradation data DTM [9:0] to the other end of the second shifting capacitor CDM.

According to this embodiment, the first voltage output circuit DFR changes the voltage of the other end of the first shifting capacitor CFR on the basis of the polarity inversion signal FR, and thus the voltage VFB of the inverting input node NAN of the computation amplifier 71 is shifted through the division of the first shifting capacitor CFR, the second feedback capacitor Cfb and the second shifting capacitor CDM. In addition, the second voltage output circuit DDM changes the voltage of the other end of the second shifting capacitor CDM on the basis of the higher-level bit DTM [9], and thus the voltage VFB of the inverting input node NAN of the computation amplifier 71 is shifted through the division of the second shifting capacitor CDM, the second feedback capacitor Cfb and the first shifting capacitor CFR.

7. Electronic Apparatus

Figure 26:
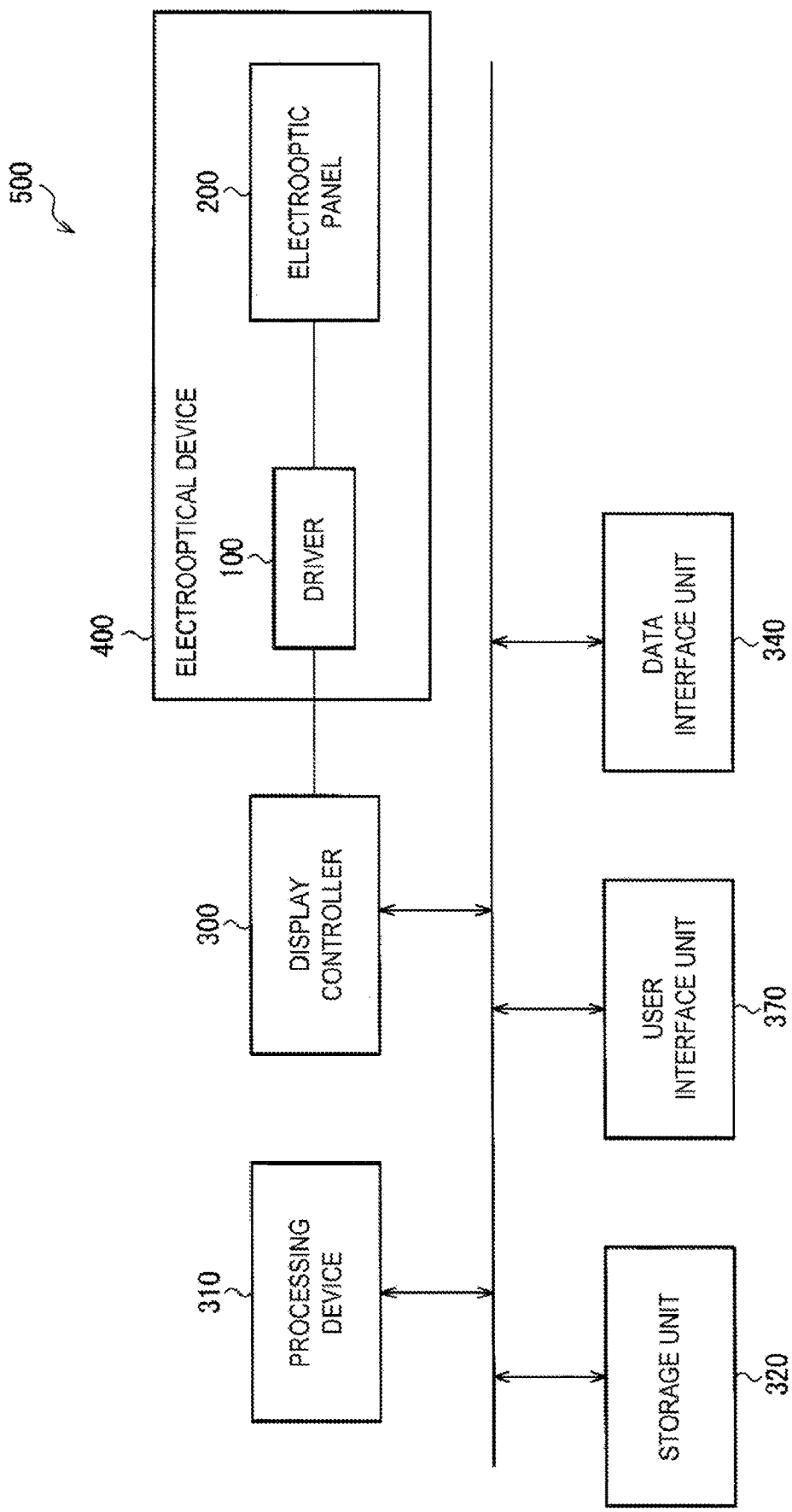
FIG. 26 illustrates a configuration example of an electronic apparatus.

FIG. 26 illustrates a configuration example of an electronic apparatus including the driver of the embodiment. The electronic apparatus of the embodiment may be various electronic apparatuses equipped with a display device. For example, the electronic apparatus is a projector, a television device, an information processing device, a mobile information terminal, a car navigation system, a mobile game terminal, or the like.

An electronic apparatus 500 includes the electrooptical device 400, the display controller 300, a processing device 310, a storage unit 320, a user interface unit 330, and a data interface unit 340. An electrooptical device 400 includes a driver 100 and an electrooptic panel 200.

The electrooptic panel 200 is a matrix-type liquid crystal display panel, for example. Alternatively, the electrooptic panel 200 may be an EL display panel using a self-luminous element. EL is an abbreviation of Electro-Luminescence. The user interface unit 330 is an interface unit that receives various operations from the user. For example, it is composed of a button, a mouse, a keyboard, a touch panel equipped in the electrooptic panel 200 and the like. The data interface unit 340 is an interface unit for inputting and outputting image data or control data. For example, it is a wired communication interface of USB or the like, or a radio communication interface of wireless LAN or the like. The storage unit 320 stores the image data input from the data interface unit 340. Alternatively, the storage unit 320 functions as a working memory of the processing device 310 or the display controller 300. The processing device 310 performs the control process of each unit of the electronic apparatus and various data processes. The processing device 310 is a processor such as a microcomputer or a CPU. The display controller 300 performs the control process of the driver 100. For example, the display controller 300 converts image data transferred from the data interface unit 340 or the storage unit 320 into a format that can be received by the driver 100, and outputs the converted image data to the driver 100. The driver 100 drives the electrooptic panel 200 on the basis of the image data transferred from the display controller 300.

The driver of the embodiment described above includes a first driving circuit configured to supply a data signal to a signal supply line of an electrooptic panel based on gradation data, and a second driving circuit electrically coupled to the signal supply line. The second driving circuit includes the computation amplifier being made up of a transistor with a breakdown voltage lower than a breakdown voltage of a transistor making up the first driving circuit, and the output capacitor being disposed between an output node of the computation amplifier and the signal supply line. The second driving circuit includes the first feedback capacitor being disposed between an inverting input node of the computation amplifier and the signal supply line, the second feedback capacitor including one end coupled to the inverting input node of the computation amplifier.

According to this embodiment, with the output capacitor and the first feedback capacitor, the computation amplifier and the signal supply line are DC disconnected. In addition, with the first feedback capacitor and the second feedback capacitor, the voltage of the signal supply line is divided and fed back to the inverting input node of the computation amplifier. As a result, a voltage lower than the voltage of the signal supply line is applied to the inverting input node of the computation amplifier, and thus the computation amplifier can be composed of the transistor with the breakdown voltage lower than the breakdown voltage of the transistor making up the first driving circuit. In addition, with the computation amplifier composed of the low breakdown voltage transistor, the computation amplifier can be composed of a transistor with high mobility. In this manner, the frequency response characteristic and the amplification factor of the computation amplifier can both be achieved. In addition, as a result, the power consumption of the computation amplifier can be suppressed.

In addition, in this embodiment, the second driving circuit may include a D/A conversion circuit configured to supply a D/A conversion voltage based on the gradation data to the inverting input node of the computation amplifier. The other end of the second feedback capacitor may be electrically coupled to a predetermined potential node.

According to this embodiment, when there is a difference between the D/A conversion voltage and the voltage fed back from the signal supply line to the inverting input node of the computation amplifier, the computation amplifier supplies a charge to the signal supply line through the output capacitor, and thus the difference between the voltage of the signal supply line and the target voltage corresponding to the gradation data can be corrected. In this manner, even in the case where there is an error between the voltage output by the first driving circuit to the signal supply line and the target voltage, the error can be corrected by the second driving circuit.

In addition, in this embodiment, a capacitance of the second feedback capacitor may be greater than a capacitance of the first feedback capacitor.

According to this embodiment, the gain of the second driving circuit is greater than 2, and therefore the voltage range applied to the computation amplifier is smaller than ½ of the voltage range of the signal supply line. In this manner, the computation amplifier can be composed of a transistor with a breakdown voltage lower than the breakdown voltage of the transistor making up the first driving circuit.

In addition, in this embodiment, a distance between a source and a drain of the transistor making up the first driving circuit may be greater than a distance between a source and a drain of a transistor making up the second driving circuit. Alternatively, a film thickness of a gate insulating film of the transistor making up the first driving circuit may be greater than a film thickness of a gate insulating film of the transistor making up the second driving circuit.

According to this embodiment, the transistor making up the second driving circuit including the computation amplifier can be composed of a transistor with a breakdown voltage lower than the breakdown voltage of the transistor making up the first driving circuit.

In addition, this embodiment may further include an initialization switch configured to be turned on in an initialization period, and supply a reference voltage to the inverting input node of the computation amplifier.

According to this embodiment, the inverting input node of the computation amplifier changes with respect to the reference voltage. When the range of D/A conversion voltage is represented by (reference voltage−$\Delta V1$) to (reference voltage+$\Delta V2$), it suffices to set the reference voltage such that (reference voltage−$\Delta V1$) is higher than the low-potential side power source voltage of the second driving circuit, and that (reference voltage+$\Delta V2$) is lower than the high-potential side power source voltage of the second driving circuit.

In addition, in this embodiment, the first driving circuit may include a capacitor driving circuit configured to output first to n-th capacitor drive voltages corresponding to the gradation data to first to n-th capacitor driving nodes, n being an integer of 2 or more, and a capacitor circuit including first to n-th capacitors disposed between the signal supply line and the first to n-th capacitor driving nodes. n is an integer of 2 or more.

According to this embodiment, the capacitor driving circuit outputs the first to n-th capacitor drive voltages corresponding to the gradation data and thus the first to n-th capacitors output the charge of the electric charge amount corresponding to the gradation data to the signal supply line. As a result, the voltage corresponding to the gradation data is output to the signal supply line. Since this driving is not feedback-controlled, errors may be caused between the voltage output through the driving and the target voltage. This error can be corrected by the second driving circuit through a feedback-control.

In addition, this embodiment may further include a control circuit configured to control the first driving circuit. the first driving circuit may include a first driving transistor group disposed between the signal supply line and a node to which a high-potential side power source voltage is supplied, and a second driving transistor group disposed between the signal supply line and a node to which a low-potential side power source voltage is supplied. The control circuit may control on or off each transistor of the first driving transistor group or each transistor of the second driving transistor group based on the gradation data.

According to this embodiment, the transistor of the first driving transistor group or the second driving transistor group that is turned on based on the gradation data outputs the charge of the electric charge amount corresponding to the gradation data to the signal supply line. As a result, the voltage corresponding to the gradation data is output to the signal supply line. Since this driving is not feedback-controlled, errors may be caused between the voltage output through the driving and the target voltage. This error can be corrected by the second driving circuit through a feedback-control.

In addition, this embodiment may further include a voltage shift circuit electrically coupled to the inverting input node of the computation amplifier and configured to shift a voltage of the inverting input node.

According to this embodiment, the voltage shift circuit shifts the voltage of the inverting input node of the computation amplifier, and thus the reference of the voltage of inverting input node is shifted. By dividing the range of the voltage output to the signal supply line into a plurality of ranges and shifting the reference of the voltage of the inverting input node for each range, each range of the voltage output to the signal supply line and the range of the D/A conversion voltage can be associated with each other. In this manner, the gain of the second driving circuit can be reduced, and the number of gradations of the D/A conversion can be reduced.

In addition, in this embodiment, based on a polarity inversion signal, the voltage shift circuit may set initialization voltages that are different between an initialization period of a positive polarity drive period and an initialization period of a negative polarity drive period, to the inverting input node of the computation amplifier.

According to this embodiment, the range of the voltage output to the signal supply line in the positive polarity drive period and the range of the D/A conversion voltage are associated with each other, and the range of the voltage output to the signal supply line in the negative polarity drive period and the range of the D/A conversion voltage are associated with each other. In this manner, the gain of the second driving circuit 70 can be set to about ½, and the number of gradations of the D/A conversion can be reduced to ½.

In addition, in this embodiment, the voltage shift circuit may include an initialization switch configured to be turned on in an initialization period and supply a reference voltage to the inverting input node of the computation amplifier. The voltage shift circuit may include a shifting capacitor including one end electrically coupled to the inverting input node of the computation amplifier, and a voltage output circuit configured to output a voltage based on the polarity inversion signal to the other end of the shifting capacitor in the initialization period.

According to this embodiment, the voltage output circuit changes the voltage of the other end of the shifting capacitor on the basis of the polarity inversion signal, and thus the voltage of the inverting input node of the computation amplifier is shifted through the division of the second feedback capacitor and the shifting capacitor.

In addition, in this embodiment, the voltage shift circuit may include a first initialization switch configured to supply an initializing voltage for a positive polarity to the inverting input node of the computation amplifier in an initialization period of a positive electrode drive period, and a second initialization switch configured to supply an initializing voltage for a negative polarity to the inverting input node of the computation amplifier in an initialization period of a negative electrode drive period.

According to this embodiment, the initialization voltages that are different between the initialization period of the positive polarity drive period and the initialization period of the negative polarity drive period are set for the inverting input node of the computation amplifier. In this manner, the gain of the second driving circuit can be reduced to about ½, and the number of gradations of the D/A conversion can be reduced to ½.

In addition, in this embodiment, the voltage shift circuit may shift a voltage of the inverting input node of the computation amplifier based on a polarity inversion signal and a higher-level bit of the gradation data.

According to this embodiment, the range of the voltage output to the signal supply line is divided into four ranges, and each range and the range of the D/A conversion voltage are associated with each other. In this manner, the gain of the second driving circuit can be reduced to about ¼, and the number of gradations of the D/A conversion can be reduced to ¼.

In addition, in this embodiment, the voltage shift circuit may include an initialization switch configured to be turned on in an initialization period and supply a reference voltage to the inverting input node of the computation amplifier. The voltage shift circuit may include a first shifting capacitor including one end electrically coupled to the inverting input node of the computation amplifier, and a first voltage output circuit configured to output a voltage based on the polarity inversion signal to the other end of the first shifting capacitor in the initialization period. The voltage shift circuit may include a second shifting capacitor including one end electrically coupled to the inverting input node of the computation amplifier, and a second voltage output circuit configured to output a voltage based on the higher-level bit of the gradation data to the other end of the second shifting capacitor.

According to this embodiment, the first voltage output circuit changes the voltage of the other end of the first shifting capacitor on the basis of the polarity inversion signal, and thus the voltage of the inverting input node of the computation amplifier is shifted through the division of the first shifting capacitor, the second feedback capacitor and the second shifting capacitor. In addition, the second voltage output circuit changes the voltage of the other end of the second shifting capacitor on the basis of the higher-level bit of the gradation data, and thus the inverting input node of the computation amplifier voltage can be shifted through the division of the second shifting capacitor, the second feedback capacitor and the first shifting capacitor.

In addition, an electrooptical device of this embodiment includes any of the above-described drivers and an electrooptic panel.

In addition, an electronic apparatus of this embodiment includes any of the above-described drivers.

Although the embodiment has been described in detail above, it will be readily understood by those skilled in the art that many variations are possible that do not materially depart from the novel matters and effects of the present disclosure. Accordingly, all such variations shall be included within the scope of this disclosure. For example, a term that is mentioned at least once in the specification or drawings together with a different term that is broader or synonymous may be replaced by that different term at any point in the specification or drawings. All combinations of the embodiments and variations are also included within the scope of this disclosure. In addition, the configurations, operations, and the like of the control circuit, the data line driving circuit, the driver, the electrooptic panel, the electrooptical device, the electronic apparatus and the like are not limited to the embodiment, and various variations may be made.

What is claimed is:

1. A driver comprising:
    a first driving circuit configured to supply a data signal to a signal supply line of an electrooptic panel based on gradation data; and
    a second driving circuit including a computation amplifier, an output capacitor, a first feedback capacitor, and a second feedback capacitor, and electrically coupled to the signal supply line, the computation amplifier being made up of a transistor with a breakdown voltage lower than a breakdown voltage of a transistor making up the first driving circuit, the output capacitor being disposed between an output node of the computation amplifier and the signal supply line, the first feedback capacitor being disposed between an inverting input node of the computation amplifier and the signal supply line, the second feedback capacitor including one end electrically coupled to the inverting input node of the computation amplifier.

2. The driver according to claim 1, wherein
    the second driving circuit includes a D/A conversion circuit configured to supply a D/A conversion voltage based on the gradation data to the non-inverting input node of the computation amplifier, and
    the other end of the second feedback capacitor is electrically coupled to a predetermined potential node.

3. The driver according to claim 1, wherein
    a capacitance of the second feedback capacitor is greater than a capacitance of the first feedback capacitor.

4. The driver according to claim 1, wherein
    a distance between a source and a drain of the transistor making up the first driving circuit is greater than a distance between a source and a drain of a transistor making up the second driving circuit, or a film thickness of a gate insulating film of the transistor making up the first driving circuit is greater than a film thickness of a gate insulating film of the transistor making up the second driving circuit.

5. The driver according to claim 1, further comprising an initialization switch configured to be turned on in an initialization period, and supply a reference voltage to the inverting input node of the computation amplifier.

6. The driver according to claim 1, wherein the first driving circuit includes:
a capacitor driving circuit configured to output first to n-th capacitor drive voltages corresponding to the gradation data to first to n-th capacitor driving nodes, n being an integer of 2 or more, and
a capacitor circuit including first to n-th capacitors disposed between the signal supply line and the first to n-th capacitor driving nodes.

7. The driver according to claim 1, further comprising a control circuit configured to control the first driving circuit, wherein
the first driving circuit includes:
a first driving transistor group disposed between the signal supply line and a node to which a high-potential side power source voltage is supplied, and
a second driving transistor group disposed between the signal supply line and a node to which a low-potential side power source voltage is supplied, and
the control circuit performs on-off control of each transistor of the first driving transistor group or each transistor of the second driving transistor group based on the gradation data.

8. The driver according to claim 1, further comprising a voltage shift circuit electrically coupled to the inverting input node of the computation amplifier and configured to shift a voltage of the inverting input node.

9. The driver according to claim 8, wherein
the voltage shift circuit sets an initialization voltage for the inverting input node of the computation amplifier based on a polarity inversion signal, the initialization voltage in an initialization period of a positive polarity drive period being different from that in an initialization period of a negative polarity drive period.

10. The driver according to claim 9, wherein
the voltage shift circuit includes:
an initialization switch configured to be turned on in an initialization period and supply a reference voltage to the inverting input node of the computation amplifier,
a shifting capacitor including one end electrically coupled to the inverting input node of the computation amplifier, and
a voltage output circuit configured to output a voltage based on the polarity inversion signal to the other end of the shifting capacitor in the initialization period.

11. The driver according to claim 8, wherein
the voltage shift circuit includes:
a first initialization switch configured to supply an initializing voltage for a positive polarity to the inverting input node of the computation amplifier in an initialization period of a positive electrode drive period, and
a second initialization switch configured to supply an initializing voltage for a negative polarity to the inverting input node of the computation amplifier in an initialization period of a negative electrode drive period.

12. The driver according to claim 8, wherein
the voltage shift circuit shifts a voltage of the inverting input node of the computation amplifier based on a polarity inversion signal and a higher-level bit of the gradation data.

13. The driver according to claim 12, wherein
the voltage shift circuit includes:
an initialization switch configured to be turned on in an initialization period and supply a reference voltage to the inverting input node of the computation amplifier,
a first shifting capacitor including one end electrically coupled to the inverting input node of the computation amplifier,
a first voltage output circuit configured to output a voltage based on the polarity inversion signal to the other end of the first shifting capacitor in the initialization period,
a second shifting capacitor including one end electrically coupled to the inverting input node of the computation amplifier, and
a second voltage output circuit configured to output a voltage based on the higher-level bit of the gradation data to the other end of the second shifting capacitor.

14. An electrooptical device comprising:
the driver according to claim 1; and
the electrooptic panel.

15. An electronic apparatus comprising:
the driver according to claim 1.

* * * * *